US012505806B2

(12) United States Patent
No et al.

(10) Patent No.: US 12,505,806 B2
(45) Date of Patent: Dec. 23, 2025

(54) GATE DRIVING CIRCUIT

(71) Applicant: Samsung Display Co., Ltd., Yongin-Si (KR)

(72) Inventors: Sangyong No, Yongin-si (KR); Kyungho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/626,327

(22) Filed: Apr. 4, 2024

(65) Prior Publication Data

US 2025/0006136 A1 Jan. 2, 2025

(30) Foreign Application Priority Data

Jun. 30, 2023 (KR) ........................ 10-2023-0085279

(51) Int. Cl.
*G09G 3/3266* (2016.01)

(52) U.S. Cl.
CPC ... *G09G 3/3266* (2013.01); *G09G 2300/0852* (2013.01)

(58) Field of Classification Search
CPC ......... G09G 2300/0852; G09G 3/3233; G09G 3/3266
See application file for complete search history.

(56) References Cited

U.S. PATENT DOCUMENTS

| | | | | |
|---|---|---|---|---|
| 8,842,803 | B2 | 9/2014 | Jang | |
| 11,211,013 | B2 | 12/2021 | Kim et al. | |
| 11,250,768 | B2 | 2/2022 | Park et al. | |
| 2022/0189407 | A1 * | 6/2022 | Choi | G09G 3/3258 |

FOREIGN PATENT DOCUMENTS

| | | | |
|---|---|---|---|
| KR | 10-2014-0020391 | A | 2/2014 |
| KR | 10-2014-0049754 | A | 4/2014 |
| KR | 10-2021-0086293 | A | 7/2021 |
| KR | 10-2021-0086295 | A | 7/2021 |

* cited by examiner

*Primary Examiner* — Nitin Patel
*Assistant Examiner* — Amen W Bogale
(74) *Attorney, Agent, or Firm* — Innovation Counsel LLP

(57) ABSTRACT

A gate driving circuit includes a plurality of stages, wherein each of the plurality of stages includes transistors that control the voltages of control nodes by a carry signal output from a previous stage and a carry signal output from a next stage, and a transistor that reduces leakage current of a first control node.

20 Claims, 20 Drawing Sheets

GATE DRIVING CIRCUIT

CROSS-REFERENCE TO RELATED APPLICATION

This application is based on and claims priority under 35 U.S.C. § 119 to Korean Patent Application No. 10-2023-0085279, filed on Jun. 30, 2023, in the Korean Intellectual Property Office, the disclosure of which is incorporated by reference herein in its entirety.

BACKGROUND

1. Field

One or more embodiments relate to a display apparatus, and more particularly, to a gate driving circuit outputting a gate signal and a display apparatus including the gate driving circuit.

2. Description of the Related Art

A display apparatus includes a pixel portion including a plurality of pixels, a gate driving circuit, a data driving circuit, a controller, and the like. The gate driving circuit includes stages connected to gate lines, and the stages supply gate signals to the gate lines connected to the stages in response to signals from the controller.

SUMMARY

One or more embodiments include a gate driving circuit for stably outputting a gate signal and a display apparatus including the gate driving circuit. Technical features to be achieved by an embodiment are not limited to the technical features mentioned above, and other technical features that are not mentioned will be clearly understood by those of ordinary skill in the art from the description of the disclosure.

Additional aspects will be set forth in part in the description which follows and, in part, will be apparent from the description, or may be learned by practice of the presented embodiments of the disclosure.

According to one or more embodiments, a gate driving circuit includes a plurality of stages, wherein each of the plurality of stages includes a first controller, a second controller, a first output portion, and a second output portion. The first controller is connected to a first voltage input terminal and a second voltage input terminal and configured to control voltages of a first control node and a second control node during a display period of one frame. The second controller is connected to the first voltage input terminal and the first control node and configured to control a voltage of the first control node during a sensing period of the one frame. The first output portion is connected to a first clock terminal and a third voltage input terminal and configured to output a gate signal. The second output portion is connected to a second clock terminal and the second voltage input terminal and configured to output a carry signal. The first controller includes a first transistor, a second transistor, and a third transistor. The first transistor is configured to be turned on by a third clock signal input to a third clock terminal and control a voltage of the first control node with a voltage of a previous carry signal, which is a carry signal input from a previous stage. The second transistor is configured to be turned on when the first control node is at a first level voltage and control a voltage of the second control node with a second voltage input to the second voltage input terminal. The third transistor is configured to be turned on by a next carry signal, which is a carry signal input from a next stage, and control the voltage of the second control node with a first voltage input to the first voltage input terminal.

The second voltage may be lower than a third voltage input to the third voltage input terminal, and the first voltage may be higher than the second voltage and the third voltage.

The first level voltage and a second level voltage lower than the first level voltage of each of a first clock signal and a second clock signal may be alternately input during the display period, wherein the first level voltages of the first clock signal and the second clock signal may be input during the sensing period.

The third clock signal may be an inverted signal of the second clock signal, a period in which the second clock signal is at the first level voltage may overlap a period in which the first clock signal is at the first level voltage, and the period in which the first clock signal is at the first level voltage may be shorter than the period in which the second clock signal is at the first level voltage.

Each of the first transistor and the second transistor may include a first sub-transistor and a second sub-transistor connected in series.

The first controller may further include a fourth transistor connected to the first voltage input terminal and an intermediate node between the first sub-transistor and the second sub-transistor of the first transistor and having a gate connected to the first control node.

The first controller may further include a fifth transistor connected to the first voltage input terminal and an intermediate node between the first sub-transistor and the second sub-transistor of the second transistor and having a gate connected to the second control node.

The first controller may further include a sixth transistor connected to the first voltage input terminal and the second control node and having a gate receiving a reset signal.

The second controller may include a first capacitor, a seventh transistor, an eighth transistor, and a ninth transistor. The first capacitor is connected to the first voltage input terminal and a sensing node. The seventh transistor is connected to the sensing node and the second output portion and includes a first sub-transistor and a second sub-transistor connected in series. The eighth transistor is connected to the first voltage input terminal and an intermediate node between the first sub-transistor and the second sub-transistor of the seventh transistor and has a gate connected to the sensing node. The ninth transistor is connected to the intermediate node of the seventh transistor and the first control node.

The seventh transistor may be configured to be turned on by a first control signal synchronized with a carry signal output from the second output portion during the display period and set a voltage of the sensing node to a voltage of the carry signal.

The first capacitor may store a voltage difference between a terminal connected to the first voltage input terminal and a terminal connected to the sensing node.

The ninth transistor may be configured to be turned on by a second control signal input during the sensing period and set a voltage of the first control node to the first voltage transferred through the turned-on eighth transistor.

The second output portion may include a second capacitor connected between the first control node and an output terminal of the second output portion.

The first output portion may include a plurality of sub-output portions, wherein one of a plurality of first clock signals may be input to a first clock terminal of each of the plurality of sub-output portions, and the plurality of first clock signals may be signals having a same waveform and shifted in phase at a certain interval.

The second output portion may include a first sub-output portion and a second sub-output portion, wherein the first sub-output portion may output, to a next stage, a first carry signal synchronized with a 2nd-1 clock signal input to a second clock terminal of the first sub-output portion, and the second sub-output portion may output, to a previous stage, a second carry signal synchronized with a 2nd-2 clock signal input to a second clock terminal of the second sub-output portion.

A period in which the 2nd-1 clock signal is at the first level voltage may overlap periods in which a plurality of first clock signals input to the plurality of sub-output portions of the first output portion are at the first level voltage, a period in which the 2nd-1 clock signal is at the first level voltage may overlap a period in which the 2nd-2 clock signal is at the first level voltage, and the period in which the 2nd-2 clock signal is at the first level voltage may be shorter than the period in which the 2nd-1 clock signal is at the first level voltage.

The first controller may further include a tenth transistor connected between the first transistor and the first control node and having a gate connected to the first voltage input terminal.

The second controller may include an eleventh transistor connected to the first control node and the second voltage input terminal and having a gate connected to a sensing node, and a twelfth transistor connected between the first control node and the eleventh transistor.

The twelfth transistor may be configured to be turned on by a third control signal input after the sensing period and set the voltage of the first control node to the second voltage transferred through the turned-on eleventh transistor.

According to one or more embodiments, a gate driving circuit includes a plurality of stages, wherein each of the plurality of stages includes a first transistor, a second transistor, a third transistor, a fourth transistor, a fifth transistor, a first pull-up transistor, a first pull-down transistor, a second pull-up transistor, a second pull-down transistor, a first capacitor, a sixth transistor, a seventh transistor, and an eighth transistor. The first transistor is connected between a first input terminal receiving a start signal and a first control node and has a gate connected to a first clock terminal. The second transistor is connected to a first voltage input terminal and an intermediate node between a first sub-transistor and a second sub-transistor of the first transistor and has a gate connected to the first control node. The third transistor is connected between a second control node and a second voltage input terminal and has a gate connected to the first control node. The fourth transistor is connected to the first voltage input terminal and an intermediate node between a first sub-transistor and a second sub-transistor of the third transistor and has a gate connected to the second control node. The fifth transistor is connected between the first voltage input terminal and the second control node and has a gate connected to a second input terminal to which a carry signal of a next stage is input. The first pull-up transistor is connected between a second clock terminal and a first output terminal and has a gate connected to the first control node. The first pull-down transistor is connected between the first output terminal and a third voltage input terminal and has a gate connected to the second control node. The second pull-up transistor is connected between a third clock terminal and a second output terminal and has a gate connected to the first control node. The second pull-down transistor is connected between the second output terminal and the second voltage input terminal and has a gate connected to the second control node. The first capacitor is connected between the first voltage input terminal and a sensing node. The sixth transistor is connected between the sensing node and the second output terminal and has a gate connected to a first control signal terminal. The seventh transistor is connected to the first voltage input terminal and an intermediate node between a first sub-transistor and a second sub-transistor of the sixth transistor and has a gate connected to the sensing node. The eighth transistor is connected between the intermediate node of the sixth transistor and the first control node and has a gate connected to a second control signal terminal.

BRIEF DESCRIPTION OF THE DRAWINGS

The above and other aspects, and features of certain embodiments of the disclosure will be more apparent from the following description taken in conjunction with the accompanying drawings.

DETAILED DESCRIPTION

Figure 1:
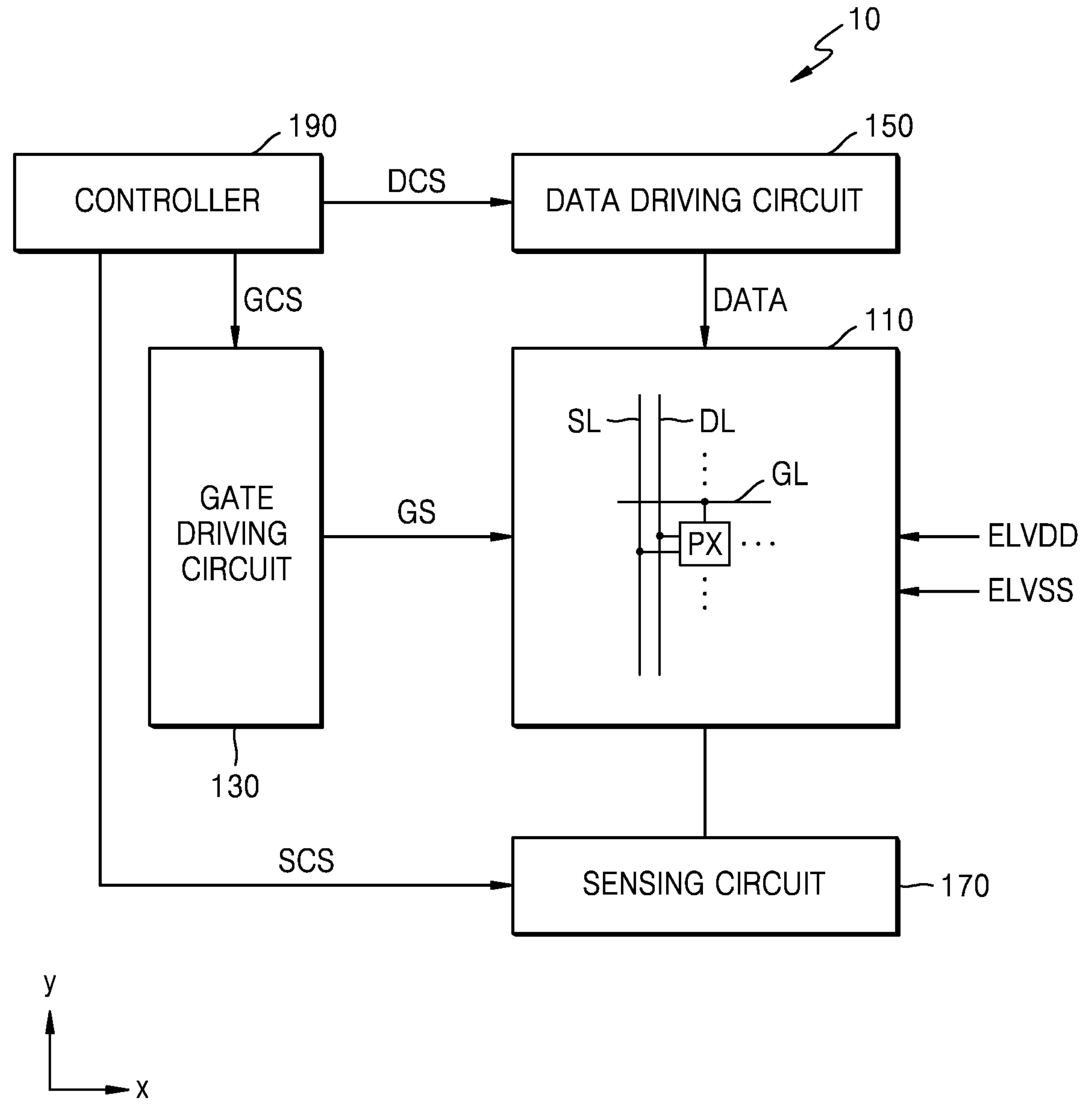
FIG. 1 is a schematic block diagram of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

It will be further understood that, when a layer, region, or element is referred to as being "on" another layer, region, or element, it can be directly or indirectly on the other layer, region, or element. That is, for example, intervening layers, regions, or elements may be present.

Sizes of elements in the drawings may be exaggerated or reduced for convenience of explanation. As an example, the size and thickness of each element shown in the drawings are arbitrarily represented for convenience of description, and thus, the present disclosure is not necessarily limited thereto.

In the present specification, "A and/or B" means A or B, or A and B. In the present specification, "at least one of A and B" means A or B, or A and B.

In embodiments below, when it is described that X is connected to Y, X may be electrically connected to Y, X may be functionally connected to Y, or X may be physically connected to Y, with or without intervening elements (for example, direct or indirect connection). Here, X and Y may be objects, e.g., apparatuses, elements, circuits, wirings, electrodes, terminals, conductive layers, layers, and the like. Accordingly, X and Y are not limited to preset connection relationships and connection relationships shown and made in the drawings and the detailed description, but may include connection relationships other than the connection relationships shown and made in the drawings and the detailed description.

The case where X is electrically connected to Y may include, for example, a case where X and Y are directly connected to each other, and a case where at least one element, e.g., a switch, a transistor, a capacitance element, an inductor, a resistance element, a diode, and the like, enabling electrical connection between X and Y is connected between X and Y.

In embodiments below, "ON" used in association with an element state may denote an active state of an element, and "OFF" may denote an inactive state of an element. "ON" used in association with a signal received by an element may denote a signal activating the element, and "OFF" may denote a signal inactivating the element. An element may be activated by a high-level voltage or a low-level voltage. As an example, a P-channel transistor (a P-type transistor) may be activated by a low-level voltage, and an N-channel transistor (an N-type transistor) may be activated by a high-level voltage. Accordingly, it should be understood that "ON" voltages for a P-type transistor and an N-type transistor are opposite (low vs. high) voltages.

In an embodiment described hereinafter, an x direction, a y direction, and a z direction are not limited to directions in three axes on a rectangular coordinate system and may be interpreted in a broader sense. For example, the x direction, the y direction, and the z direction may be perpendicular to one another or may refer to different directions that are not perpendicular to one another.

A display apparatus according to some embodiments of the disclosure may be an apparatus displaying a video or a static image. The display apparatus may be used as a display screen of various devices, such as a television, a notebook computer, a monitor, a broadcasting panel, and an Internet of things (IOT) device, as well as portable electronic devices, such as a mobile phone, a smart phone, a tablet personal computer (PC), a mobile communication terminal, an electronic notebook, an electronic book, a portable multimedia player (PMP), a navigation device, and a ultra mobile PC (UMPC). Also, the display apparatus according to an embodiment may be used in wearable devices, such as a smart watch, a watch phone, a glasses-type display, and a head-mounted display (HMD). Also, the display apparatus according to an embodiment may be used as: a center information display (CID) on a gauge of a vehicle or a center fascia or a dashboard of the vehicle; a room mirror display substituting a side-view mirror of a vehicle; or a display disposed on a rear surface of a front seat, as an entertainment device for a backseat of a vehicle. Also, the display apparatus may be a flexible device.

FIG. 1 is a schematic block diagram of a display apparatus 10 according to an embodiment.

Referring to FIG. 1, the display apparatus 10 may include a pixel portion 110, a gate driving circuit 130, a data driving circuit 150, a sensing circuit 170, and a controller 190.

The pixel portion 110 may be provided in a display area. In a peripheral area outside the display area, various conductive lines for transmitting electrical signals to be applied to the display area, external circuits electrically connected to pixel circuits, and pads to which a printed circuit board or driver IC chip is attached may be located. For example, the gate driving circuit 130, the data driving circuit 150, the sensing circuit 170, and the controller 190 may be provided in the peripheral area.

A plurality of gate lines GL, a plurality of data lines DL, a plurality of sensing lines SL, and a plurality of pixels PX connected thereto may be arranged in the pixel portion 110. The plurality of pixels PX may be arranged in various forms, such as a stripe arrangement, a Pentile® arrangement (diamond arrangement), a mosaic arrangement, and the like to implement an image. Each of the pixels PX may include an organic light-emitting diode as a display element (light-emitting element), and the organic light-emitting diode may be connected to a pixel circuit. The pixel circuit may include a plurality of transistors and at least one capacitor. The pixel PX may emit, for example, red, green, blue, or white light through the organic light-emitting diode. Each pixel PX may be connected to a corresponding gate line among the plurality of gate lines GL, a corresponding sensing line among the plurality of sensing lines SL, and a corresponding data line among the plurality of data lines DL.

A plurality of pixels PX may be arranged to overlap the gate driving circuit 130 at at least one corner of the display apparatus 10. Accordingly, a dead area may be reduced and the display area may be expanded.

Each of the gate lines GL may extend in an x direction (row direction) and be connected to pixels PX located in the same row. Each of the gate lines GL may transmit a gate signal to each of the pixels PX in the same row. Each of the data lines DL may extend in a y direction (column direction) and be connected to pixels PX located in the same column. Each of the data lines DL may transmit a data signal DATA to each of the pixels PX in the same column in synchronization with a gate signal. Each of the sensing lines SL may extend in the y direction (column direction) and be connected to pixels PX located in the same column.

The gate driving circuit 130 may be connected to the plurality of gate lines GL, generate gate signals GS in response to a gate control signal GCS from the controller 190, and sequentially supply the gate signals GS to the gate lines GL. The gate line GL may be connected to a gate of a transistor included in the pixel PX. The gate signal GS may be a gate control signal for controlling turn-on and turn-off of a transistor whose gate is connected to the gate line GL. The gate signal GS may be a square wave signal including a gate-on voltage at which a transistor may be turned on and a gate-off voltage at which the transistor may be turned off.

The data driving circuit 150 may be connected to the plurality of data lines DL and supply the data signals DATA to the data lines DL in response to a data control signal DCS from the controller 190. The data signal DATA supplied to the data line DL may be supplied to a pixel PX to which the gate signal GS is supplied. The data driving circuit 150 may convert input image data having a gray level input from the controller 190 into a data signal DATA in the form of voltage or current.

The sensing circuit 170 may be connected to the plurality of sensing lines SL and may sense state information of the pixels PX through the sensing lines SL during a sensing period in response to a sensing control signal SCS from the controller 190. In an embodiment, the sensing lines SL may be provided for each vertical line (column). In an embodiment, pixels PX of a plurality of columns may share one sensing line SL. The sensing circuit 170 may measure state information of the pixels PXs based on a current and/or voltage fed back through the sensing lines SL. The state information may include at least one of a threshold voltage and a mobility of a driving transistor included in the pixel PX, and deterioration information of an organic light-emitting diode that is a display element. The state information of the pixel PX may be transferred to the controller 190 and/or the data driving circuit 150 and may be used to correct the data signal DATA.

The controller 190 may generate the control signals GCS, DCS, and SCS based on signals input from the outside and selectively supply them to the gate driving circuit 130, the data driving circuit 150, and the sensing circuit 170. The gate control signal GCS output to the gate driving circuit 130 may include a plurality of clock signals and a start signal. The data control signal DCS output to the data driving circuit 150 may include a start signal and a plurality of clock signals.

The display apparatus 10 may supply a driving voltage ELVDD and a common voltage ELVSS to the pixels PX. The driving voltage ELVDD may be a high-level voltage applied to a driving transistor electrically connected to a first electrode (pixel electrode or anode) of the display element included in the pixel PX. The common voltage ELVSS may be a low-level voltage provided to a second electrode (opposite electrode or cathode) of the display element included in the pixel PX.

The display apparatus 10 includes a display panel, and the display panel may include a substrate. The pixels PX may be arranged in the display area of the substrate. Part or all of the gate driving circuit 130 may be directly formed in the peripheral area of the substrate during a process of forming transistors constituting the pixel circuit in the display area of the substrate. The data driving circuit 150, the sensing circuit 170, and the controller 190 may be formed as separate integrated circuit chips or as a single integrated circuit chip and may be arranged on a flexible printed circuit board (FPCB) electrically connected to pads arranged on one side of the substrate. In an embodiment, the data driving circuit 150, the sensing circuit 170, and the controller 190 may be directly arranged on the substrate by using a chip on glass (COG) or chip on plastic (COP) method.

Hereinafter, an organic light-emitting display apparatus will be described as an example of a display apparatus according to an embodiment of the disclosure. However, the display apparatus of the disclosure is not limited thereto. In an embodiment, the display apparatus of the disclosure may be a display apparatus, such as an inorganic light-emitting display (or inorganic electroluminescence (EL) display) and a quantum dot light-emitting display.

Figure 2:
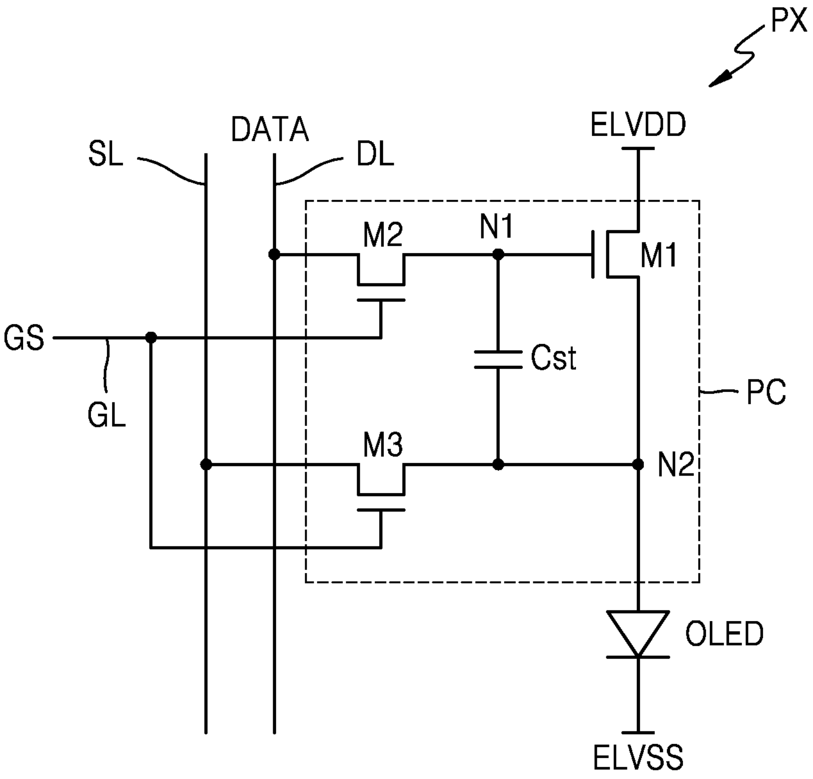
FIG. 2 is an equivalent circuit diagram of a pixel according to an embodiment.

FIG. 2 is an equivalent circuit diagram of a pixel PX according to an embodiment.

Referring to FIG. 2, each pixel PX may include a pixel circuit PC and an organic light-emitting diode OLED as a display element connected to the pixel circuit PC. The pixel circuit PC includes a first transistor M1, a second transistor M2, a third transistor M3, and a capacitor Cst. The first transistor M1 may be a driving transistor that outputs a driving current corresponding to a data signal DATA, and the second and third transistors M2 and M3 may be switching transistors that transfer signals. The first terminal (first electrode) and the second terminal (second electrode) of each of the first to third transistors M1 to M3 may be a source or a drain depending on voltages of the first terminal and the second terminal. For example, depending on the voltages of the first terminal and the second terminal, the first terminal may be the drain and the second terminal may be the source, or the first terminal may be the source and the second terminal may be the drain.

The first transistor M1 may include a first terminal connected to a first power source supplying the driving voltage ELVDD, and a second terminal connected to a first electrode (pixel electrode) of the organic light-emitting diode OLED (or connected to another node N2). A gate of the first transistor M1 may be connected to a node N1. The first transistor M1 may control a driving current flowing from the first power source to the organic light-emitting diode OLED in response to a voltage stored in the capacitor Cst. The organic light-emitting diode OLED may emit light having a certain luminance via a driving current.

The second transistor M2 (write transistor) may include a gate connected to a gate line GL, a first terminal connected to a data line DL, and a second terminal connected to the node N1. The second transistor M2 may be turned on by the gate signal GS supplied to the gate line GL and electrically connect the data line DL to the node N1 and may be configured to transfer the data signal DATA input through the data line DL to the node N1.

The third transistor M3 (sensing transistor) may include a gate connected to the gate line GL, a first terminal connected to the second terminal of the first transistor M1 and the first electrode of the organic light-emitting diode OLED, and a second terminal connected to a sensing line SL. The third transistor M3 may be turned on by a gate signal GS supplied through the gate line GL and electrically connect the sensing line SL to the second terminal of the first transistor M1 and the first electrode of the organic light-emitting diode OLED and may be configured to transfer current and/or a voltage supplied from the second terminal of first transistor M1 to the first electrode of the organic light-emitting diode OLED to the sensing line SL.

The capacitor Cst may be connected between the node N1 and the second terminal of the first transistor T1. The capacitor Cst may store a voltage corresponding to a difference between a voltage received from the second transistor M2 and a voltage of the second terminal of the first transistor M1.

The organic light-emitting diode OLED may include a first electrode (pixel electrode) connected to the second terminal of the first transistor M1 and a second electrode (opposite electrode) connected to a second power source to which the common voltage ELVSS is applied. The organic light-emitting diode OLED may emit light with a luminance corresponding to the amount of driving current supplied from the first transistor M1.

Although the transistors of the pixel circuit PC in FIG. 2 are N-type transistors, an embodiment of the disclosure is not limited thereto. For example, the transistors of the pixel circuit PC may be P-type transistors, or some of the transistors of the pixel circuit PC may be P-type transistors and others may be N-type transistors.

According to an embodiment, at least the first transistor M1 may be an oxide thin-film transistor including a semiconductor layer including an amorphous or crystalline oxide semiconductor. For example, the first to third transistors M1 to M3 may be oxide thin-film transistors. The oxide thin-film transistors have excellent off current characteristics. The oxide semiconductor may include a Zn oxide-based material, such as Zn oxide, In—Zn oxide, or Ga—In—Zn oxide. In some embodiments, the oxide semiconductor may be an In—Ga—Zn—O (IGZO) semiconductor. In some embodiments, the oxide semiconductor may be an In—Sn—Ga—Zn—O (ITGZO) semiconductor. In an embodiment, the oxide thin-film transistor may be a low temperature polycrystalline oxide (LTPO) thin-film transistor. Alternatively, according to an embodiment, at least one of the first to third transistors M1 to M3 may be a low temperature poly-silicon (LTPS) thin-film transistor including an active layer (a semiconductor layer) including polysilicon. The LTPS thin-film transistor has high electron mobility and thus has fast driving characteristics.

The pixel PX may receive a data signal from a corresponding data line when a gate signal is supplied through a corresponding gate line during a driving period. The pixel PX receiving the data signal may control the amount of current flowing from the first power source to the second power source via the organic light-emitting diode OLED in response to the data signal. In this case, the organic light-emitting diode OLED may generate light of a certain luminance in response to the amount of current.

When a gate signal is supplied through a corresponding gate line during a sensing period, the pixel PX may output a current and/or voltage through a sensing line based on a sensing signal supplied to a corresponding data line.

Figure 3:
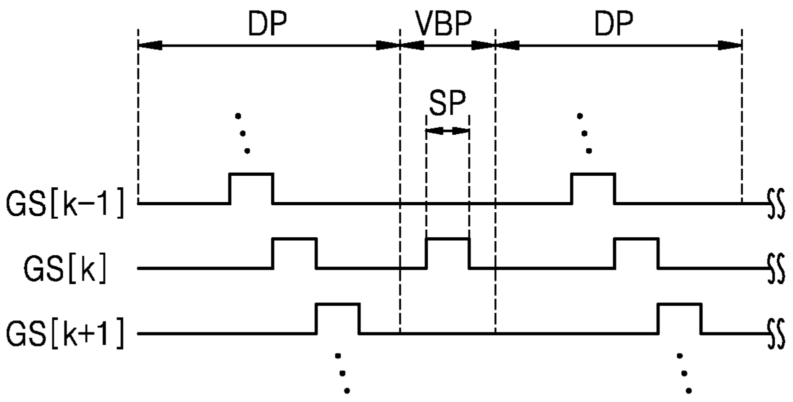
FIG. 3 is a diagram for explaining driving of a display apparatus according to an embodiment.

FIG. 3 is a diagram for explaining driving of a display apparatus according to an embodiment.

Referring to FIG. 3, the display apparatus may operate by dividing one frame into a display period DP in which an image is displayed and a vertical blank period VBP. Because the state information of a pixel is sensed in the vertical blank period VBP, it may be understood that the vertical blank period VBP includes a sensing period SP.

The display period DP may be a period during which the pixels PX display a certain image in response to the data signal. The second transistor M2 and the third transistor M3 of the pixel PX may be turned on according to the gate signal GS supplied during the display period DP, and thus, the voltage between the node N1, e.g., see FIG. 2, of the pixel PX and the second terminal of the first transistor M1 may be set to match the driving current. When the gate signal GS is supplied, the data signal DATA may be supplied to the data line DL and an initialization voltage may be supplied to the sensing line SL. In an embodiment, the initialization voltage may be set in response to deterioration of the organic light-emitting diode OLED. When the initialization voltage is supplied to the pixel PX during the display period DP, a required voltage may be charged to the capacitor Cst without being affected by deterioration of the organic light-emitting diode OLED.

The sensing period SP may be activated in an arbitrary frame by a certain frame period or a user's setting. An arbitrary row for pixel sensing may be selected during the sensing period SP. FIG. 3 illustrates an example in which pixels PX in a k-th row are sensed during the sensing period SP.

The second transistor M2 and the third transistor M3 of the pixel PX receiving the gate signal GS during the sensing period SP may be turned on. When the gate signal GS is supplied, the sensing voltage for pixel sensing may be supplied to the data line DL, and the mobility and/or threshold voltage of the first transistor M1 may be measured by measuring the current and/or voltage of the sensing line SL. In an embodiment, the sensing voltage may be a black gradation voltage at which the first transistor M1 is turned off. In an embodiment, the sensing voltage may be a preset reference voltage. The reference voltage may be set to a voltage at which the first transistor M1 may be turned on. A voltage applied to the first electrode of the organic light-emitting diode OLED may include deterioration information of the organic light-emitting diode OLED. In various embodiments, after the sensing period SP, a period for initializing the voltage of the node N1 and/or the voltage of the first electrode of the organic light-emitting diode OLED or for resetting the voltage to a voltage set before the sensing period SP may be further provided.

Figure 4:
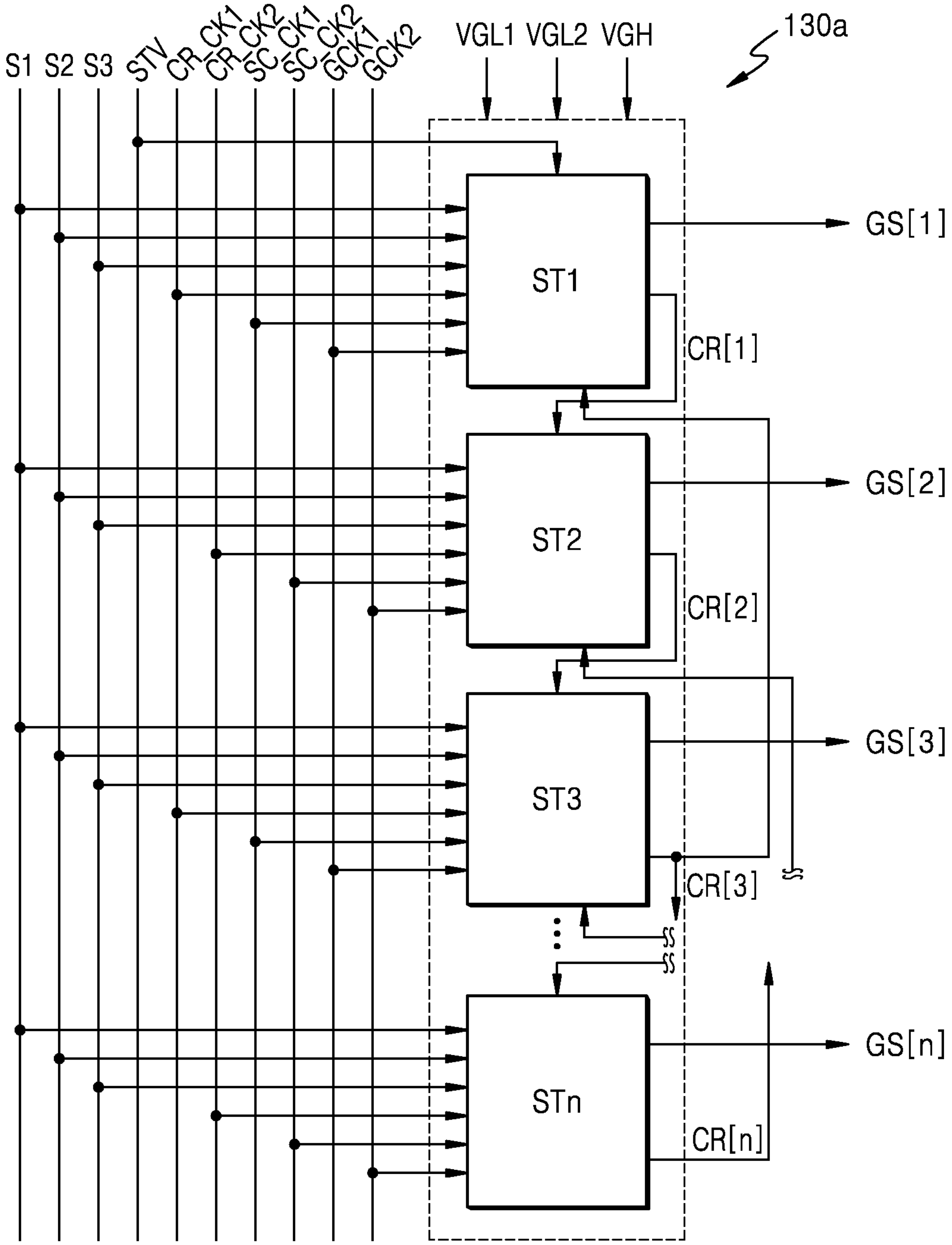
FIG. 4 is a schematic diagram of a gate driving circuit according to an embodiment.
Figure 5:
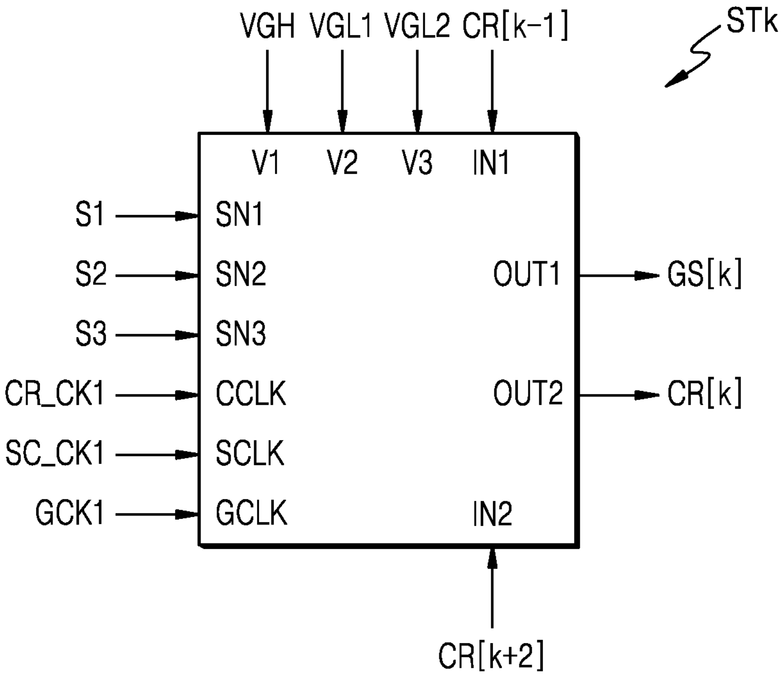
FIG. 5 is a schematic diagram of one stage of the gate driving circuit shown in FIG. 4.
Figure 6:
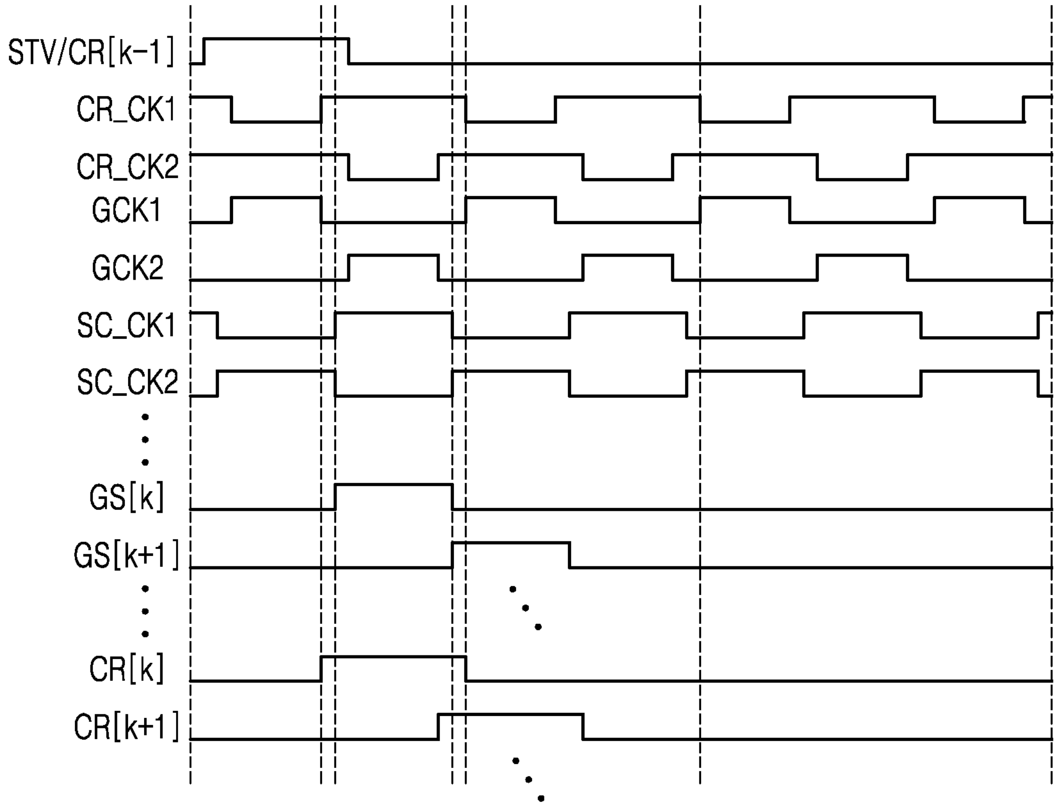
FIG. 6 is a diagram illustrating signals input to and signals output from stages of the gate driving circuit shown in FIG. 4.

FIG. 4 is a schematic diagram of a gate driving circuit 130*a* according to an embodiment. FIG. 5 is a schematic diagram of one stage of the gate driving circuit 130*a* shown in FIG. 4. FIG. 6 is a diagram illustrating signals input to and signals output from stages of the gate driving circuit 130*a* shown in FIG. 4. FIG. 5 shows a k-th stage STk outputting a k-th gate signal GS[k] to a gate line of a k-th row as an example.

Referring to FIG. 4, the gate driving circuit 130*a* according to an embodiment may include a plurality of stages ST1 to STn. The plurality of stages ST1 to STn may sequentially output gate signals GS[1] to GS[n] to gate lines. The number of stages provided in the gate driving circuit 130*a* may vary according to the number of rows (horizontal lines) provided in the pixel portion 110.

Each of the stages ST1 to STn may be connected to a gate line of a corresponding row. Each of the stages ST1 to STn may receive at least one clock signal and at least one voltage signal, generate a gate signal GS, and supply the gate signal GS to a connected gate line GL. That is, the plurality of stages ST1 to STn may respectively output gate signals GS[1], GS[2], GS[3], . . . , GS[n] to gate lines GL provided in corresponding rows. For example, a first stage ST1 may output a first gate signal GS[1] through a first gate line and an n-th stage STn may output an n-th gate signal GS[n] through an n-th gate line.

Referring to FIG. 5, each of the stages ST1 to STn may include a first input terminal IN1, a second input terminal IN2, a first voltage input terminal V1, a second voltage input terminal V2, a third voltage input terminal V3, a carry clock terminal CCLK, a scan clock terminal SCLK, a gate clock terminal GCLK, a first control signal terminal SN1, a second control signal terminal SN2, a third control signal terminal SN3, a first output terminal OUT1, and a second output terminal OUT2.

A start signal STV or a carry signal, hereinafter, referred to as a 'previous carry signal', output from a previous stage may be input to the first input terminal IN1. For example, the start signal STV may be input to the first input terminal IN1 of the first stage ST1, and a previous carry signal may be input to the first input terminal IN1 of each of the second to n-th stages ST2 to STn as a start signal. The previous stage may be at least one previous stage. FIGS. 4 and 5 show an example in which the previous stage is an immediately previous stage. For example, as shown in FIG. 5, a carry signal CR[k−1] output from a (k−1)-th stage may be input as a start signal to the first input terminal IN1 of the k-th stage STk.

A carry signal, hereinafter, referred to as a 'next carry signal', output from a next stage may be input to the second input terminal IN2. The next stage may be at least one next stage. FIGS. 4 and 5 show an example in which the next stage is a stage after two stages. For example, as shown in FIG. 5, a carry signal CR[k+2] output from a (k+2)-th stage may be input to the second input terminal IN2 of the k-th stage STk.

A first voltage VGH may be input to the first voltage input terminal V1, a second voltage VGL1 may be input to the second voltage input terminal V2, and a third voltage VGL2 may be input to the third voltage input terminal V3. The second voltage VGL1 may have a lower voltage than the first voltage VGH. The third voltage VGL2 may have a lower voltage than the second voltage VGL1. The first voltage VGH, the second voltage VGL1, and the third voltage VGL2 may be input as global signals from the controller 190 shown in FIG. 1 and/or a power supply circuit not shown.

A first carry clock signal CR_CK1 or a second carry clock signal CR_CK2 may be input to the carry clock terminal CCLK. The first carry clock signal CR_CK1 and the second carry clock signal CR_CK2 may be alternately input to the carry clock terminals CCLK of the stages ST1 to STn. For example, the first carry clock signal CR_CK1 may be input to the carry clock terminals CCLK of odd-numbered stages ST1, ST3, . . . . The second carry clock signal CR_CK2 may be input to the carry clock terminal CCLK of even-numbered stages ST2, ST4, . . . .

As shown in FIG. 6, the first carry clock signal CR_CK1 and the second carry clock signal CR_CK2 may be square wave signals repeating a high-level voltage and a low-level voltage. The high-level voltage may be a gate-on voltage for turning on the N-type transistor, and the low-level voltage may be a gate-off voltage for turning off the N-type transistor. The first carry clock signal CR_CK1 and the second carry clock signal CR_CK2 may have the same waveform and may be phase-shifted signals. For example, the second carry clock signal CR_CK2 may have the same waveform as the first carry clock signal CR_CK1 and may be input by being phase-shifted (phase-delayed) at a certain interval. The second carry clock signal CR_CK2 may be shifted by a half cycle from the first carry clock signal CR_CK1. The gate-on voltage period of each of the first carry clock signal CR_CK1 and the second carry clock signal CR_CK2 may be set to be longer than the gate-off voltage period thereof in one cycle. However, the disclosure is not limited thereto, and the gate-on voltage period of each of the first carry clock signal CR_CK1 and the second carry clock signal CR_CK2 may be equal to or shorter than the gate-off voltage period thereof in one cycle. The gate-on voltage of each of the first carry clock signal CR_CK1 and the second carry clock signal CR_CK2 may be 18 volts (V), and the gate-off voltage thereof may be −10V. However, the disclosure is not limited thereto.

The gate-on voltage and the gate-off voltage of each of the first carry clock signal CR_CK1 and the second carry clock signal CR_CK2 may be alternately input in the display period DP, and the gate-off voltage may be input in the vertical blank period VBP.

The first scan clock signal SC_CK1 or the second scan clock signal SC_CK2 may be input to the scan clock terminal SCLK. The first scan clock signal SC_CK1 and the second scan clock signal SC_CK2 may be alternately input to the scan clock terminals SCLK of the stages ST1 to STn. For example, the first scan clock signal SC_CK1 may be input to the scan clock terminals SCLK of the odd-numbered stages ST1, ST3, . . . . The second scan clock signal SC_CK2 may be input to the scan clock terminals SCLK of the even-numbered stages ST2, ST4, . . . .

As shown in FIG. 6, the first scan clock signal SC_CK1 and the second scan clock signal SC_CK2 may be square wave signals repeating a high-level voltage (gate-on voltage) and a low-level voltage (gate-off voltage). The first scan clock signal SC_CK1 and the second scan clock signal SC_CK2 may have the same waveform and may be phase-shifted signals. For example, the second scan clock signal SC_CK2 may have the same waveform as the first scan clock signal SC_CK1 and be input by being phase-shifted (phase-delayed) at a certain interval. The second scan clock signal SC_CK2 may be shifted by a half cycle from the first scan clock signal SC_CK1. The gate-on voltage period and the gate-off voltage period of each of the first scan clock signal SC_CK1 and the second scan clock signal SC_CK2 may be set to be equal to each other in one cycle. However, the disclosure is not limited thereto, and the gate-on voltage period of each of the first scan clock signal SC_CK1 and the second scan clock signal SC_CK2 may be set to be longer or shorter than the gate-off voltage period thereof in one cycle. The gate-on voltage of each of the first scan clock signal SC_CK1 and the second scan clock signal SC_CK2 may be 20V, and the gate-off voltage thereof may be −5V. However, the disclosure is not limited thereto.

The gate-on voltage and the gate-off voltage of each of the first scan clock signal SC_CK1 and the second scan clock signal SC_CK2 may be alternately input in the display period DP, and the gate-on voltage may be input in the sensing period SP.

The first gate clock signal GCK1 or the second gate clock signal GCK2 may be input to the gate clock terminal GCLK. The first gate clock signal GCK1 and the second gate clock signal GCK2 may be alternately input to the gate clock terminals GCLK of the stages ST1 to STn. For example, the first gate clock signal GCK1 may be input to the gate clock terminals GCLK of the odd-numbered stages ST1, ST3, . .

. . The second gate clock signal GCK2 may be input to the gate clock terminals GCLK of the even-numbered stages ST2, ST4, . . . .

As shown in FIG. 6, the first gate clock signal GCK1 and the second gate clock signal GCK2 may be square wave signals repeating a high-level voltage (gate-on voltage) and a low-level voltage (gate-off voltage). The first gate clock signal GCK1 and the second gate clock signal GCK2 may have the same waveform and may be phase-shifted signals. For example, the second gate clock signal GCK2 may have the same waveform as the first gate clock signal GCK1 and be input by being phase-shifted (phase-delayed) at a certain interval. The second gate clock signal GCK2 may be shifted by a half cycle from the first gate clock signal GCK1. The gate-on voltage period of each of the first gate clock signal GCK1 and the second gate clock signal GCK2 may be set to be shorter than the gate-off voltage period thereof in one cycle. However, the disclosure is not limited thereto, and the gate-on voltage period of each of the first gate clock signal GCK1 and the second gate clock signal GCK2 may be set to be equal to or longer than the gate-off voltage period thereof in one cycle. The gate-on voltage of each of the first gate clock signal GCK1 and the second gate clock signal GCK2 may be 20V, and the gate-off voltage thereof may be −12V. However, the disclosure is not limited thereto.

In an embodiment, the first gate clock signal GCK1 may be an inverted signal of the first carry clock signal CR_CK1, and the second gate clock signal GCK2 may be an inverted signal of the second carry clock signal CR_CK2. The gate-on voltage period of the first carry clock signal CR_CK1 may overlap the gate-on voltage period of the first scan clock signal SC_CK1 and may be longer than the gate-on voltage period of the first scan clock signal SC_CK1. The gate-on voltage period of the second carry clock signal CR_CK2 may overlap the gate-on voltage period of the second scan clock signal SC_CK2 and may be longer than the gate-on voltage period of the second scan clock signal SC_CK2.

The gate-on voltage and the gate-off voltage of each of the first gate clock signal GCK1 and the second gate clock signal GCK2 may be alternately input in the display period DP, and the gate-off voltage may be input in the vertical blank period VBP.

A first control signal S1 may be input to the first control signal terminal SN1. The first control signal S1 may be selectively supplied as a gate-on voltage to stages corresponding to rows on which sensing is to be performed in a corresponding frame, and thus, a sensing node M, e.g., refer to FIG. 7, in each of the stages may be charged.

A second control signal S2 may be input to the second control signal terminal SN2. When the second control signal S2 is supplied as a gate-on voltage, the voltage of the sensing node M charged by the first control signal S1 may be supplied to a first control node Q, e.g., see FIG. 7, in each of the stages ST1 to STn.

A third control signal S3 may be input to the third control signal terminal SN3. When an operation error of the display apparatus occurs, the third control signal S3 may be supplied as a gate-on voltage to each of the stages ST1 to STn for a certain time, and thus, a second control node QB, e.g., see FIG. 7, in each of the stages ST1 to STn may be set to a first level voltage. The third control signal S3 may be a reset signal for making the gate signal become a gate-off voltage for inactivating a transistor.

A gate signal may be output from the first output terminal OUT1. The gate signals GS[1], GS[2], GS[3], . . . , and GS[n] output from the first output terminals OUT1 of the stages ST1 to STn may be sequentially shifted by a certain period. Each gate signal may be supplied to a pixel through a corresponding gate line.

A carry signal may be output from the second output terminal OUT2. The carry signals CR[1], CR[2], CR[3], . . . , and CR[n] output from the second output terminals OUT2 of the stages ST1 to STn may be sequentially shifted by a certain period. The carry signal may be supplied to the first input terminal IN1 of a next stage and the second input terminal IN2 of a previous stage.

Although not shown in the drawings, the gate driving circuit 130*a* may further include at least one previous dummy stage before the first stage ST1 and at least one next dummy stage after the n-th stage STn.

The previous dummy stage may generate a carry signal in response to the start signal STV and output the carry signal to a next stage. For example, the gate driving circuit 130*a* may include one previous dummy stage, and the previous dummy stage may generate a carry signal in response to the start signal STV and supply the generated carry signal to the first input terminal IN1 of the first stage ST1.

The next dummy stage may receive the carry signal output from the previous stage as a start signal, generate a carry signal, and output the generated carry signal to the previous stage. For example, the gate driving circuit 130*a* may include two next dummy stages, and the next dummy stages may generate a carry signal in response to the carry signal input from the previous stage, e.g., the (n−1)-th stage and the n-th stage STn, and supply the generated carry signal to the second input terminal IN2 of each of the (n−1)-th stage and the n-th stage STn.

Figure 7:
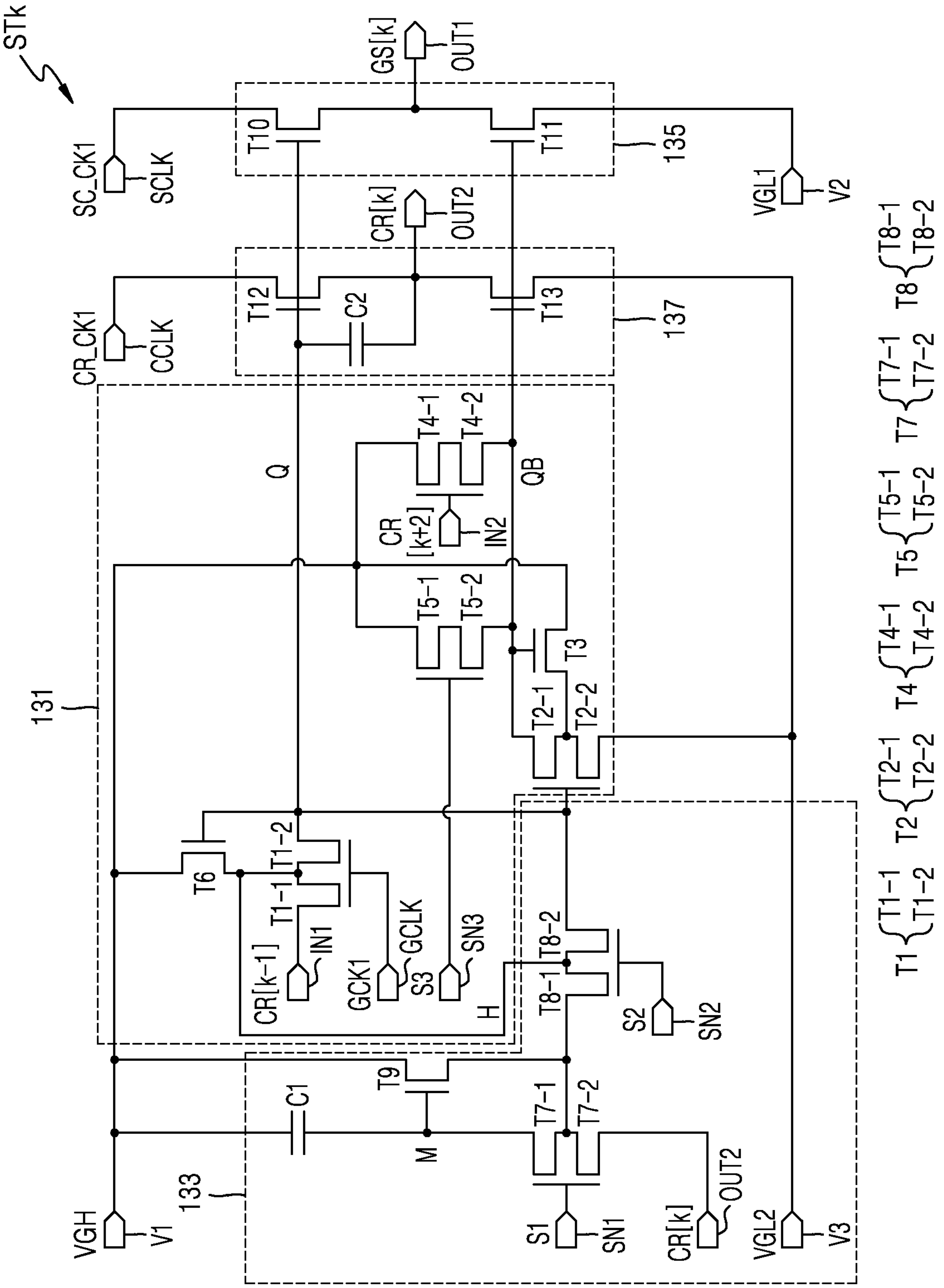
FIG. 7 is a circuit diagram illustrating an example of a stage included in a gate driving circuit according to an embodiment.
Figure 8A:
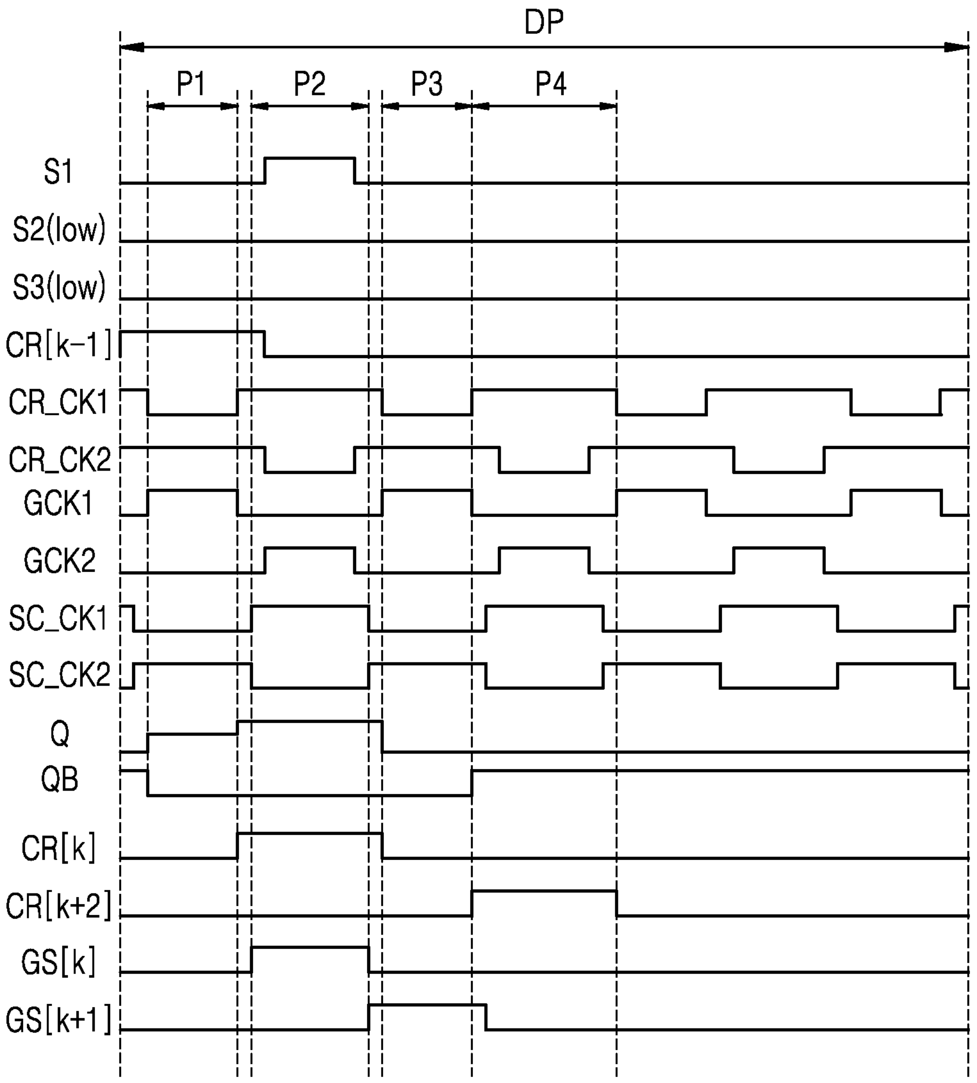
FIGS. 8A and 8B are diagrams illustrating signals for explaining driving of the stage of FIG. 7.
Figure 8B:
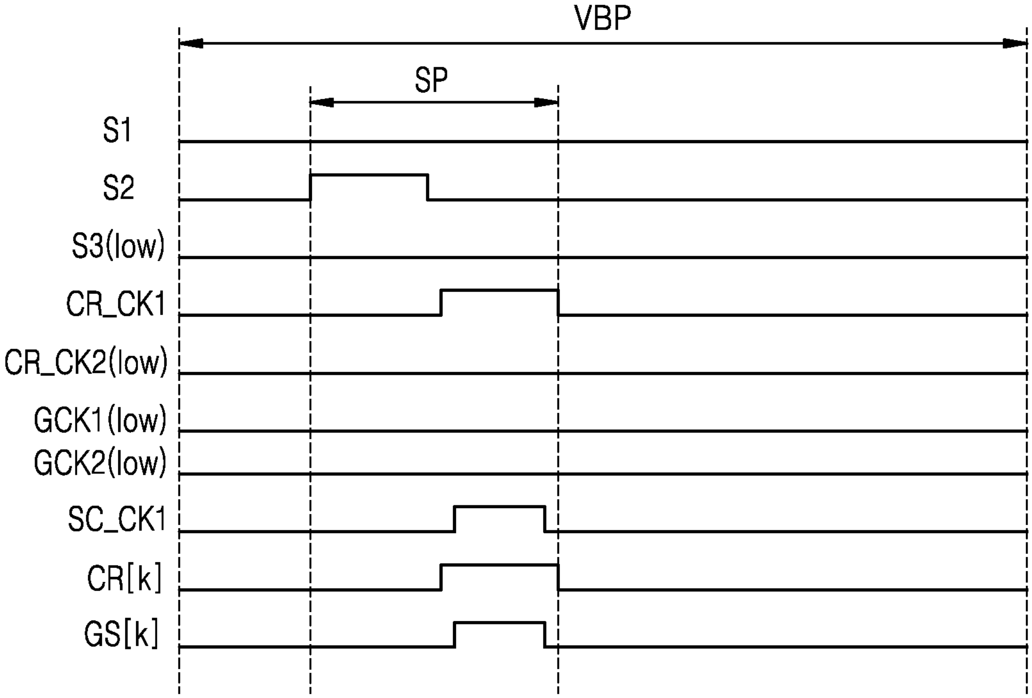

FIG. 7 is a circuit diagram illustrating an example of a stage included in a gate driving circuit according to an embodiment. FIGS. 8A and 8B are diagrams illustrating signals for explaining driving of the stage of FIG. 7.

Each of the stages ST1 to STn has a plurality of nodes, and hereinafter, some nodes among the plurality of nodes are referred to as the sensing node M, the first control node Q, and the second control node QB. In an embodiment, a plurality of transistors included in each of the first to n-th stages ST1 to STn may be N-type thin-film transistors. The N-type thin-film transistors may be oxide thin-film transistors. Hereinafter, a high level may be expressed as a first level, and a low level may be expressed as a second level.

In the odd-numbered stages, the first carry clock signal CR_CK1 may be supplied to the carry clock terminal CCLK, the first scan clock signal SC_CK1 may be supplied to the scan clock terminal SCLK, and the first gate clock signal GCK1 may be supplied to the gate clock terminal GCLK. In the even-numbered stage, the second carry clock signal CR_CK2 may be supplied to the carry clock terminal CCLK, the second scan clock signal SC_CK2 may be supplied to the scan clock terminal SCLK, and the second gate clock signal GCK2 may be supplied to the gate clock terminal GCLK.

Hereinafter, a k-th stage STk corresponding to a k-th row of the pixel portion 110 will be described as an example. The k-th stage STk may receive a (k−1)-th carry signal CR[k−1] as a start signal from a (k−1)-th stage, which is the previous stage and output a k-th gate signal GS[k] to a gate line of the k-th row. For convenience of description, an example, in which the k-th stage STk is an odd-numbered stage, the first carry clock signal CR_CK1 is supplied to the carry clock terminal CCLK, the first scan clock signal SC_CK1 is supplied to the scan clock terminal SCLK, and the first gate clock signal GCK1 is supplied to the gate clock terminal GCLK, will be described. When k is 1, the first stage ST1 may receive the start signal STV through the first input terminal IN.

For convenience of description below, supplying an arbitrary signal means that a gate-on voltage, e.g., a first level voltage that is a high-level voltage, is supplied, and not supplying a signal means that a gate-off voltage, e.g., a second level voltage that is a low-level voltage, is supplied. The first voltage VGH may be the first level voltage, and the second voltage VGL1 and the third voltage VGL2 may each be the second level voltage.

The k-th stage STk may include a first controller 131, a second controller 133, a first output portion 135, and a second output portion 137.

The first controller 131 may control the voltages of the first control node Q and the second control node QB in response to signals input through the first input terminal IN1, the second input terminal IN2, the gate clock terminal GCLK, and the third control signal terminal SN3. For example, the first controller 131 may control the voltages of the first control node Q and the second control node QB in response to the previous carry signal CR[k−1], the next carry signal CR[k+2], the first gate clock signal GCK1, and the third control signal S3. The first controller 131 may include first to sixth transistors T1 to T6.

The first transistor T1 may be connected between the first input terminal IN1 and the first control node Q. The first transistor T1 may include a plurality of sub-transistors connected in series. The sub-transistors may include a pair of transistors, that is, a 1st-1 transistor T1-1 and a 1st-2 transistor T1-2. Gates of the 1st-1 transistor T1-1 and 1st-2 transistor T1-2 may be connected to the gate clock terminal GCLK. The 1st-1 transistor T1-1 and the 1st-2 transistor T1-2 may be turned on when the first gate clock signal GCK1 is supplied and may set the voltage of the first control node Q to the voltage of the previous carry signal CR[k−1].

The second transistor T2 may be connected between the second control node QB and the third voltage input terminal V3. The second transistor T2 may include a plurality of sub-transistors connected in series. The sub-transistors may include a pair of transistors, that is, a 2nd-1 transistor T2-1 and a 2nd-2 transistor T2-2. Gates of the 2nd-1 transistor T2-1 and the 2nd-2 transistor T2-2 may be connected to the first control node Q. The 2nd-1 transistor T2-1 and the 2nd-2 transistor T2-2 may be turned on when the first control node Q is at a first level voltage, and thus, the voltage of the second control node QB may be set to the third voltage VGL2.

The third transistor T3 may be connected between the first voltage input terminal V1 and an intermediate node (common electrode) between the 2nd-1 transistor T2-1 and the 2nd-2 transistor T2-2. A gate of the third transistor T3 may be connected to the second control node QB. The third transistor T3 may be turned on when the second control node QB is at a first level voltage, and thus, the voltage of the intermediate node between the 2nd-1 transistor T2-1 and the 2nd-2 transistor T2-2 may be set to the first voltage VGH.

The fourth transistor T4 may be connected between the first voltage input terminal V1 and the second control node QB. The fourth transistor T4 may include a plurality of sub-transistors connected in series. The sub-transistors may include a pair of transistors, that is, a 4th-1 transistor T4-1 and a 4th-2 transistor T4-2. Gates of the 4th-1 transistor T4-1 and the 4th-2 transistor T4-2 may be connected to the second input terminal IN2. The 4th-1 transistor T4-1 and the 4th-2 transistor T4-2 may be turned on when the next carry signal CR[k+2] of the first level voltage is supplied, and thus, the voltage of the second control node QB may be set to the first voltage VGH.

The fifth transistor T5 may be connected between the first voltage input terminal V1 and the second control node QB. The fifth transistor T5 may include a plurality of sub-transistors connected in series. The sub-transistors may include a pair of transistors, that is, a 5th-1 transistor T5-1 and a 5th-2 transistor T5-2. Gates of the 5th-1 transistor T5-1 and the 5th-2 transistor T5-2 may be connected to the third control signal terminal SN3. The 5th-1 transistor T5-1 and the 5th-2 transistor T5-2 may be turned on when the third control signal S3 is supplied and may set the voltage of the second control node QB to the first voltage VGH.

The sixth transistor T6 may be between the first voltage input terminal V1 and an intermediate node (common electrode) H between the 1st-1 transistors T1-1 and the 1st-2 transistors T1-2. A gate of the sixth transistor T6 may be connected to the first control node Q. The sixth transistor T6 may be turned on when the first control node Q is at the first level voltage, and thus, the intermediate node H between the 1st-1 transistor T1-1 and the 1st-2 transistor T1-2 may be set to the first voltage VGH.

The second controller 133 may supply the first voltage VGH to the first control node Q and the third voltage VGL2 to the second control node QB to sense state information of the pixel PX.

The second controller 133 may control the voltages of the first control node Q and the second control node QB in response to signals input to the first control signal terminal SN1 and the second control signal terminal SN2. For example, the second controller 133 may control the voltages of the first control node Q and the second control node QB in response to the first control signal S1 and the second control signal S2. The second controller 133 may include seventh to ninth transistors T7 to T9 and a first capacitor C1.

The first control signal S1 may be a signal supplied at an arbitrary timing during the display period DP. For example, the first control signal S1 may be supplied at the output timing of a k-th carry signal CR[k]. The k-th carry signal CR[k] may be a signal supplied during the display period DP to charge the sensing node M for pixel sensing. The second control signal S2 may be a signal supplied during the vertical blank period VBP to supply the first voltage VGH to the first control node Q for pixel sensing.

The seventh transistor T7 may be connected between the sensing node M and the second output terminal OUT2. The seventh transistor T7 may be turned on by the first control signal S1 synchronized with a carry signal output from the second output portion 137. The seventh transistor T7 may include a plurality of sub-transistors connected in series. The sub-transistors may include a pair of transistors, that is, a 7th-1 transistor T7-1 and a 7th-2 transistor T7-2. Gates of the 7th-1 transistor T7-1 and the 7th-2 transistor T7-2 may be connected to the first control signal terminal SN1. The 7th-1 transistor T7-1 and the 7th-2 transistor T7-2 may be turned on when the first control signal S1 is supplied, and thus, the voltage of the sensing node M may be set to the voltage of the k-th carry signal CR[k].

The eighth transistor T8 may be connected between an intermediate node (common electrode) between the 7th-1 transistor T7-1 and the 7th-2 transistor T7-2 and the first control node Q. The eighth transistor T8 may include a plurality of sub-transistors connected in series. The sub-transistors may include a pair of transistors, that is, an 8th-1 transistor T8-1 and an 8th-2 transistor T8-2. Gates of the 8th-1 transistor T8-1 and the 8th-2 transistor T8-2 may be connected to the second control signal terminal SN2. The 8th-1 transistor T8-1 and the 8th-2 transistor T8-2 may be turned on when the second control signal S2 is supplied, and thus, an intermediate node between the 7th-1 transistor T7-1 and the 7th-2 transistor T7-2 may be electrically connected to the first control node Q. An intermediate node (common electrode) H between the 8th-1 transistor T8-1 and the 8th-2 transistor T8-2 may be connected to the intermediate node H between the 1st-1 transistor T1-1 and the 1st-2 transistor T1-2 and thus may be set to the first voltage VGH transmitted through the sixth transistor T6. Accordingly, when the eighth transistor T8 is turned off, the voltage drop of the first control node Q due to the leakage current of the eighth transistor T8 may be prevented.

The ninth transistor T9 may be connected between the first voltage input terminal V1 and the intermediate node between the 7th-1 transistor T7-1 and the 7th-2 transistor T7-2. A gate of the ninth transistor T9 may be connected to the sensing node M. The ninth transistor T9 may be turned on when the sensing node M is at the first level voltage, and thus, the voltage of the intermediate node between the 7th-1 transistor T7-1 and the 7th-2 transistor T7-2 may be set to the first voltage VGH.

The first capacitor C1 may be connected between the first voltage input terminal V1 and the sensing node M. When the sensing node M is set to the first level voltage of the k-th carry signal CR[k], the first capacitor C1 may store the difference between the first voltage VGH and the voltage of the gate of the ninth transistor T9.

The first output portion 135 may output the first scan clock signal SC_CK1 or the second voltage VGL1 to the first output terminal OUT1 according to the voltages of the first control node Q and the second control node QB. The first output portion 135 may include a tenth transistor T10 and an eleventh transistor T11 connected between the scan clock terminal SCLK and the second voltage input terminal V2.

The tenth transistor T10 may be connected between the scan clock terminal SCLK and the first output terminal OUT1. A gate of the tenth transistor T10 may be connected to the first control node Q. The tenth transistor T10 may be a pull-up transistor that transfers the first level voltage to an output terminal. The tenth transistor T10 may be turned on or off in response to the voltage of the first control node Q. The tenth transistor T10 may be turned on when the voltage of the first control node Q is set to the first level voltage, and thus may output the first level voltage of the first scan clock signal SC_CK1 as the first level voltage of the k-th gate signal GS[k] or output the second level voltage of the first scan clock signal SC_CK1 as the second level voltage of the k-th gate signal GS[k].

The eleventh transistor T11 may be connected between the first output terminal OUT1 and the second voltage input terminal V2. A gate of the eleventh transistor T11 may be connected to the second control node QB. The eleventh transistor T11 may be a pull-down transistor that transfers the second level voltage to an output terminal. The eleventh transistor T11 may be turned on or off in response to the voltage of the second control node QB. The eleventh transistor T11 may be turned on when the voltage of the second control node QB is set to the first level voltage, and thus may output the second voltage VGL1 as the second level voltage of the k-th gate signal GS[k].

The second output portion 137 may output the first carry clock signal CR_CK1 or the third voltage VGL2 to the second output terminal OUT2 according to the voltages of the first control node Q and the second control node QB. The second output portion 137 may include a twelfth transistor T12 and a thirteenth transistor T13 connected between the carry clock terminal CCLK and the third voltage input terminal V3. The second output portion 137 may further include a second capacitor C2.

The twelfth transistor T12 may be connected between the carry clock terminal CCLK and the second output terminal OUT2. A gate of the twelfth transistor T12 may be connected to the first control node Q. The twelfth transistor T12 may be a pull-up transistor that transfers the first level voltage to an output terminal. The twelfth transistor T12 may be turned on or off in response to the voltage of the first control node Q. The twelfth transistor T12 may be turned on when the voltage of the first control node Q is set to the first level voltage, and thus may output the first level voltage of the first carry clock signal CR_CK1 as the first level voltage of the k-th carry signal CR[k] or output the second level voltage of the first carry clock signal CR_CK1 as the second level voltage of the k-th carry signal CR[k].

The thirteenth transistor T13 may be connected between the second output terminal OUT2 and the third voltage input terminal V3. A gate of the thirteenth transistor T13 may be connected to the second control node QB. The thirteenth transistor T13 may be a pull-down transistor that transfers the second level voltage to an output terminal. The thirteenth transistor T13 may be turned on or off in response to the voltage of the second control node QB. The thirteenth transistor T13 may be turned on when the second control node QB is set to the first level voltage, and thus may output the third voltage VGL2 as the second level voltage of the k-th carry signal CR[k].

The second capacitor C2 may be connected between the first control node Q and the second output terminal OUT2. When the voltage of the first control node Q is at the first voltage, the twelfth transistor T12 may be turned on and the first carry clock signal CR_CK1 may be output as the first level voltage of the k-th carry signal CR[k]. In this case, the voltage of the first control node Q may be boosted by the second capacitor C2.

Hereinafter, the operation of the k-th stage STk will be described with reference to FIGS. 8A and 8B, and this may be equally applied to the operations of the other stages. A case in which the third control signal S3 is supplied at the second voltage will be described as an example.

FIG. 8A shows the operation of the k-th stage STk in the display period DP.

In a first period P1, the previous carry signal CR[k−1] of the first level voltage from the (k−1)-th stage that is a previous stage may be supplied, and the next carry signal CR[K+2] of the second level voltage from the (k+2)-th stage that is a next stage may be supplied. In addition, the first gate clock signal GCK1 of the first level voltage may be supplied and the first scan clock signal SC_CK1 of the second level voltage and the first carry clock signal CR_CK1 of the second level voltage may be supplied.

The first transistor T1 may be turned on by the first gate clock signal GCK1 having the first level voltage, and the voltage of the first control node Q may be set to the first level voltage of the previous carry signal CR[k−1]. Accordingly, the tenth transistor T10 may be turned on, and thus, the second level voltage of the first scan clock signal SC_CK1 may be output from the first output terminal OUT1 as the k-th gate signal GS[k]. Also, the twelfth transistor T12 may be turned on, and thus, the second level voltage of the first carry clock signal CR_CK1 may be output from the second output terminal OUT2 as the k-th carry signal CR[k].

The second transistor T2, the gate of which is connected to the first control node Q having the first level voltage, may be turned on, and the voltage of the second control node QB may be set to the second level voltage of the third voltage VGL2. Accordingly, the eleventh transistor T11 and the thirteenth transistor T13 may be turned off.

In a second period P2, the previous carry signal CR[k−1] of the second level voltage may be supplied, the next carry signal CR[k+2] of the second level voltage may be supplied, the first gate clock signal GCK1 of the second level voltage may be supplied, and the first scan clock signal SC_CK1 of the first level voltage and the first carry clock signal CR_CK1 of the first level voltage may be supplied.

The first transistor T1 may be turned off by the first gate clock signal GCK1 having the second level voltage, and the first control node Q may maintain the first level voltage. The first level voltage of the first scan clock signal SC_CK1 may be output as the k-th gate signal GS[k] from the first output terminal OUT1 through the turned-on tenth transistor T10. Also, the first level voltage of the first carry clock signal CR_CK1 may be output as the k-th carry signal CR[k] from the second output terminal OUT2 through the turned-on twelfth transistor T12. In this case, the voltage of the first control node Q may be boosted to a higher voltage than the voltage in the first period P1 by the second capacitor C2.

The sixth transistor T6, the gate of which is connected to the first control node Q, may be turned on and the first voltage VGH may be transferred to an intermediate node H between the 1st-1 transistor T1-1 and the 1st-2 transistor T1-2, and thus, a voltage drop in the first control node Q due to leakage current of the turned-off 1st-1 transistor T1-1 and 1st-2 transistor T1-2 may be prevented.

The voltage of the second control node QB may maintain the second level voltage of the third voltage VGL2.

In a third period P3, the previous carry signal CR[k−1] of the second level voltage may be supplied, the next carry signal CR[k+2] of the second level voltage may be supplied, the first gate clock signal GCK1 of the first level voltage may be supplied, and the first scan clock signal SC_CK1 of the second level voltage and the first carry clock signal CR_CK1 of the second level voltage may be supplied.

The first transistor T1 may be turned on by the first gate clock signal GCK1 having the first level voltage, and the voltage of the first control node Q may be set to the second level voltage of the previous carry signal (CR[k−1]). Accordingly, the tenth transistor T10, the twelfth transistor T12, and the second transistor T2 may be turned off. Because the voltages of the first control node Q and the second control node QB are the second level voltages, the k-th gate signal GS[k] of the second level voltage and the k-th carry signal CR[k] of the second level voltage may be output.

In a fourth period P4, the previous carry signal CR[k−1] of the second level voltage may be supplied, the next carry signal CR[k+2] of the first level voltage may be supplied, the first gate clock signal GCK1 of the second level voltage may be supplied, and the first scan clock signal SC_CK1 of the first level voltage and the first carry clock signal CR_CK1 of the first level voltage may be supplied.

The first transistor T1 may be turned off by the first gate clock signal GCK1 having the second level voltage, and the voltage of the first control node Q may maintain the second level voltage.

The fourth transistor T4 may be turned on by the next carry signal CR[k+2] having the first level voltage, and the voltage of the second control node QB may be set to the first voltage VGH through the turned-on fourth transistor T4. Accordingly, the eleventh transistor T11 and the thirteenth transistor T13 may be turned on. The second voltage VGL1 may be output as the k-th gate signal GS[k] from the first output terminal OUT1 through the turned-on eleventh transistor T11. In addition, the third voltage VGL2 may be output as the k-th carry signal CR[k] from the second output terminal OUT2 through the turned-on thirteenth transistor T13.

The third transistor T3, the gate of which is connected to the second control node QB, may be turned on and the first voltage VGH may be transferred to an intermediate node between the 2nd-1 transistor T2-1 and the 2nd-2 transistor T2-2, and thus, the voltage of the second control node QB may be stably maintained by blocking leakage current caused by the turned-off 2nd-1 transistor T2-1 and 2nd-2 transistor T2-2.

The k-th carry signal CR[k] and the first control signal S1 may be supplied to the second controller 133 during the display period DP. As the first control signal S1 is supplied, the seventh transistor T7 may be turned on, the first level voltage of the k-th carry signal CR[k] may be supplied to the sensing node M, and the first capacitor C1 may be charged. The ninth transistor T9 having a gate connected to the sensing node M may be turned on.

FIG. 8B shows the operation of the k-th stage STk in the vertical blank period VBP. During a sensing period SP of the vertical blank period VBP, the first carry clock signal CR_CK1 of the first level voltage may be supplied, the first gate clock signal GCK1 of the second level voltage and the second gate clock signal GCK2 of the second level voltage may be supplied, and the first scan clock signal SC_CK1 of the first level voltage may be supplied. When a stage connected to a pixel to be sensed is an even stage, the second carry clock signal CR_CK2 of the first level voltage and the second scan clock signal SC_CK2 of the first level voltage may be supplied.

The second control signal S2 may be supplied to the second controller 133, and the voltage of the first control node Q may be set to the first voltage VGH through the ninth transistor T9 turned on as the gate thereof is connected to the sensing node M having the first level voltage, and the eighth transistor T8 turned on by the second control signal S2. Accordingly, the tenth transistor T10 and the twelfth transistor T12 may be turned on. The second level voltage of the first scan clock signal SC_CK1 may be output as the k-th gate signal GS[k] from the first output terminal OUT1 through the turned-on tenth transistor T10. Also, the second level voltage of the first carry clock signal CR_CK1 may be output as the k-th carry signal CR[k] from the second output terminal OUT2 through the turned-on twelfth transistor T12. As a carry clock signal having the first level voltage is input to the second output portion 137 to which the second capacitor C2 is connected in the sensing period SP, the voltage of the first control node Q may be boosted by the second capacitor C2 and thus a gate signal may be stably output.

Clock signals, i.e., a carry clock signal and a scan clock signal, having the first level voltage may be supplied after an arbitrary point in time while the second control signal S2 is supplied. FIG. 8B shows an example in which clock signals having the first level voltage are input at an arbitrary point in time after the first control node Q is set to the first voltage VGH.

The second and third transistors M2 and M3 of the pixel PX receiving the k-th gate signal GS[k] may be turned on to thereby sense status information of the first transistor M1 and the organic light-emitting diode OLED, e.g., see FIG. 2.

Figure 9:
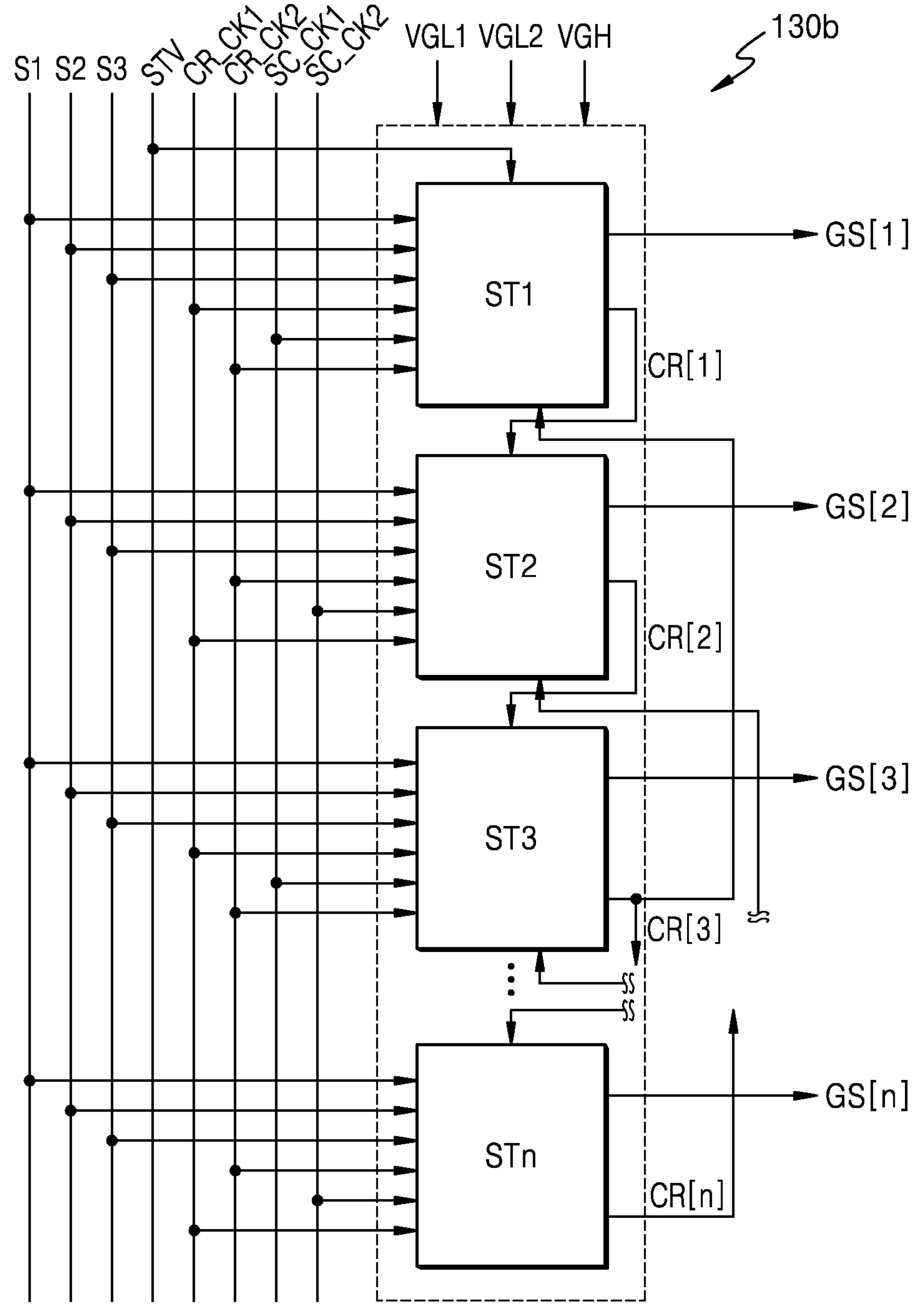
FIG. 9 is a schematic diagram of a gate driving circuit according to an embodiment.
Figure 10:
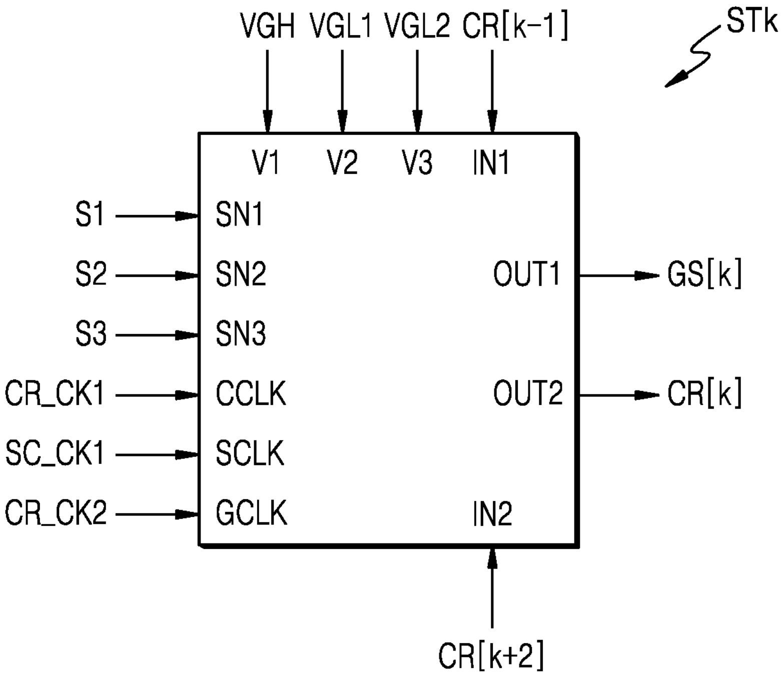
FIG. 10 is a schematic diagram of one stage of the gate driving circuit shown in FIG. 9.
Figure 11:
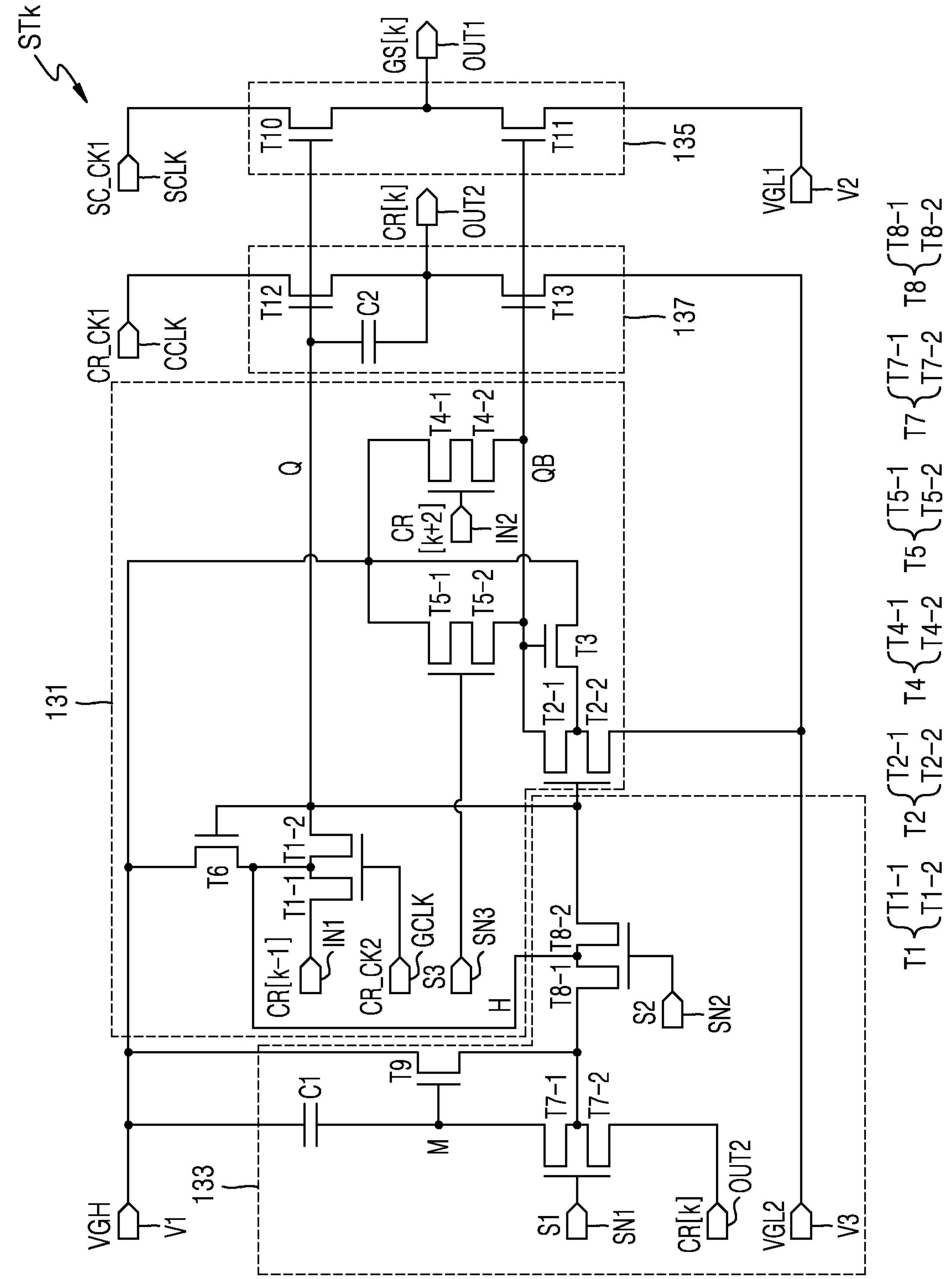
FIG. 11 is a circuit diagram illustrating an example of a stage included in a gate driving circuit according to an embodiment.
Figure 12:
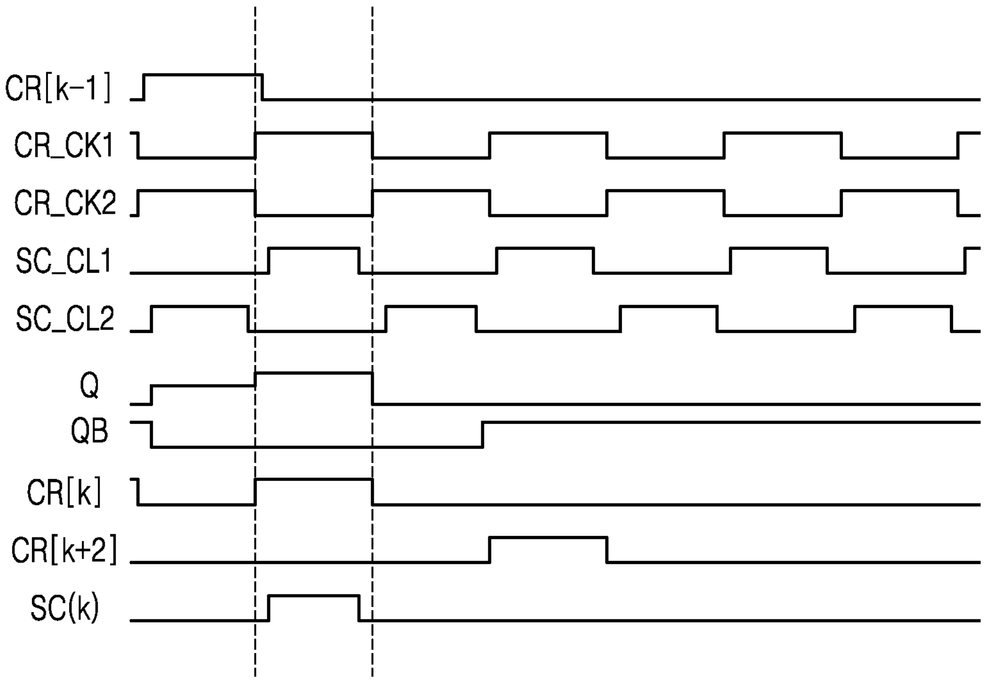
FIG. 12 is a diagram illustrating signals for explaining driving of the stage of FIG. 11.

FIG. 9 is a schematic diagram of a gate driving circuit 130*b* according to an embodiment. FIG. 10 is a schematic diagram of one stage of the gate driving circuit 130*b* shown in FIG. 9. FIG. 11 is a circuit diagram illustrating an example of a stage included in a gate driving circuit according to an embodiment. FIG. 12 is a diagram illustrating signals for explaining driving of the stage of FIG. 11.

A plurality of stages ST1 to STn of the gate driving circuit 130*b* shown in FIGS. 9 to 11 are different from those of the gate driving circuit 130*a* shown in FIGS. 4 and 5 in that the first carry clock signal CR_CK1 or the second carry clock signal CR_CK2 is input to a gate clock terminal GCLK.

As shown in FIGS. 9 to 11, in odd-numbered stages ST1, ST3, . . . , the first carry clock signal CR_CK1 may be input to a carry clock terminal CCLK, the first scan clock signal SC_CK1 may be input to a scan clock terminal SCLK, and the second carry clock signal CR_CK2 may be input to a gate clock terminal GCLK. In even-numbered stages ST2, ST4, . . . , the second carry clock signal CR_CK2 may be input to a carry clock terminal CCLK, the second scan clock signal SC_CK2 may be input to a scan clock terminal SCLK, and the first carry clock signal CR_CK1 may be input to a gate clock terminal GCLK.

FIG. 12 shows the operation of the k-th stage STk in the display period DP. Referring to FIG. 12, the first gate clock signal GCK1 and the second gate clock signal GCK2 are omitted, and in one cycle of each of the first carry clock signal CR_CK1 and the second carry clock signal CR_CK2, a gate-on voltage period may be equal to a gate-off voltage period. In an embodiment, the second carry clock signal CR_CK2 may be an inverted signal of the first carry clock signal CR_CK1.

As shown in FIG. 12, the gate-on voltage periods of the first scan clock signal SC_CK1 and the second scan clock signal SC_CK2 may be shorter than the gate-on voltage periods of the first scan clock signal SC_CK1 and the second scan clock signal SC_CK2 shown in FIG. 8A.

In addition, the operation of the k-th stage STk in the display period DP according to the timing of the signals shown in FIG. 12 is the same as the operation of the k-th stage STk in the display period DP according to the timing of the signals shown in FIG. 8A. The timing of the signals shown in FIG. 8B may be equally applied to the operation of the k-th stage STk in the vertical blank period VBP.

According to the present embodiment, because the first gate clock signal GCK1 and the second gate clock signal GCK2 may be omitted, there is no need to provide conductive lines for inputting the first gate clock signal GCK1 and the second gate clock signal GCK2, and a dead space may be reduced by reducing the area of the gate driving circuit.

Figure 13:
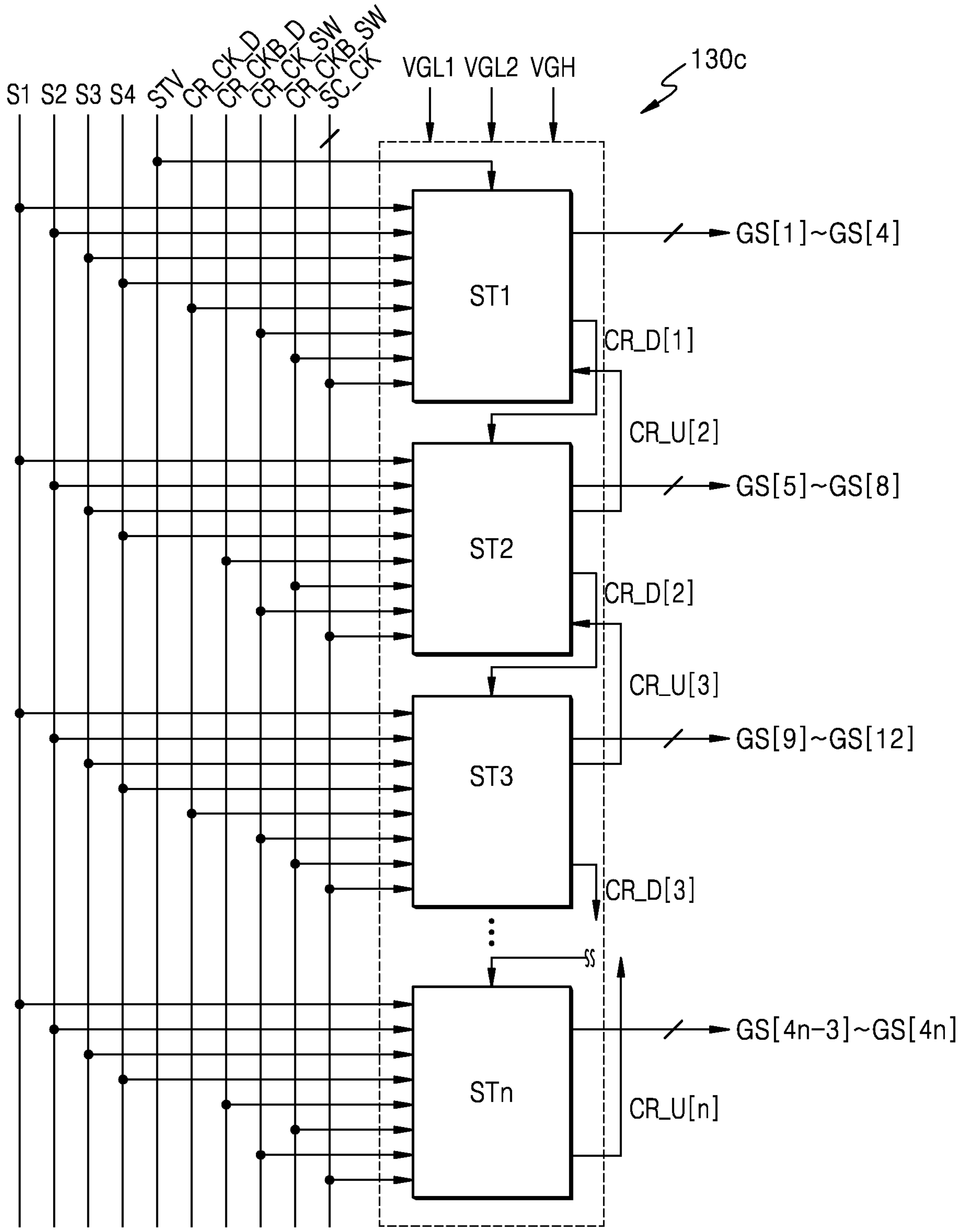
FIG. 13 is a schematic diagram of a gate driving circuit according to an embodiment.
Figure 14:
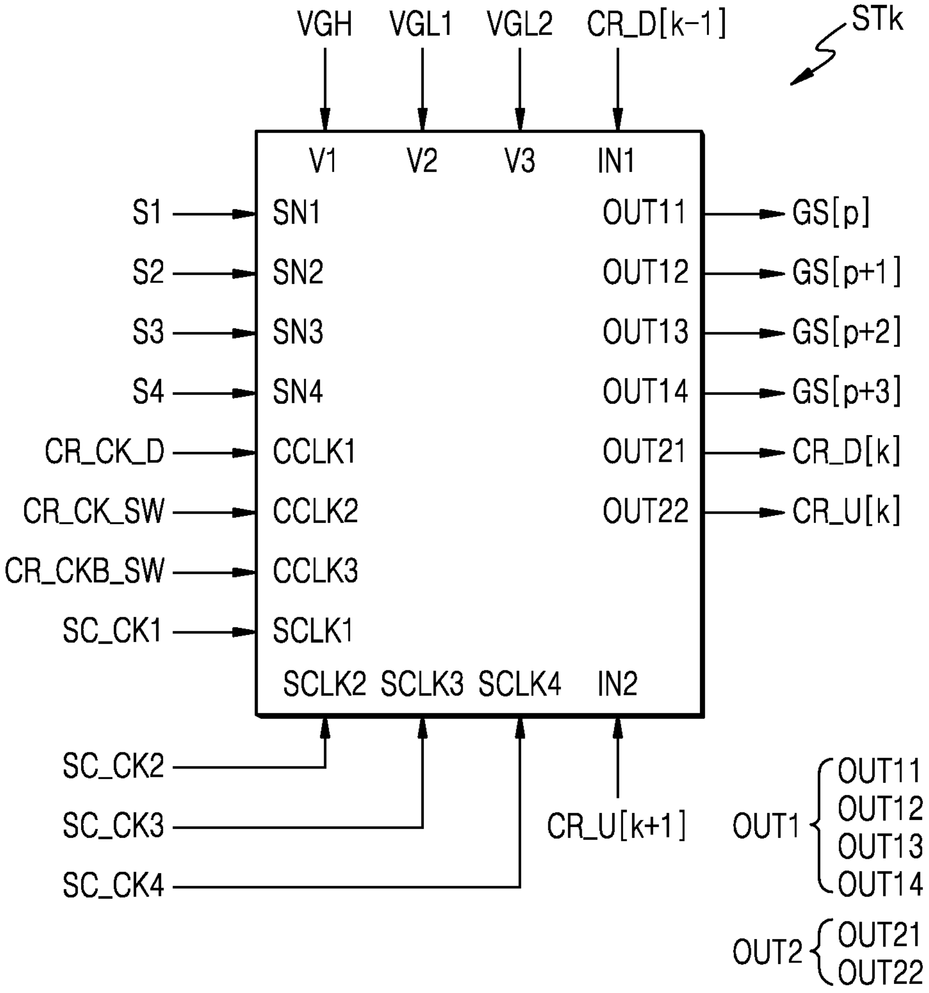
FIG. 14 is a schematic diagram of one stage of the gate driving circuit shown in FIG. 13.
Figure 15:
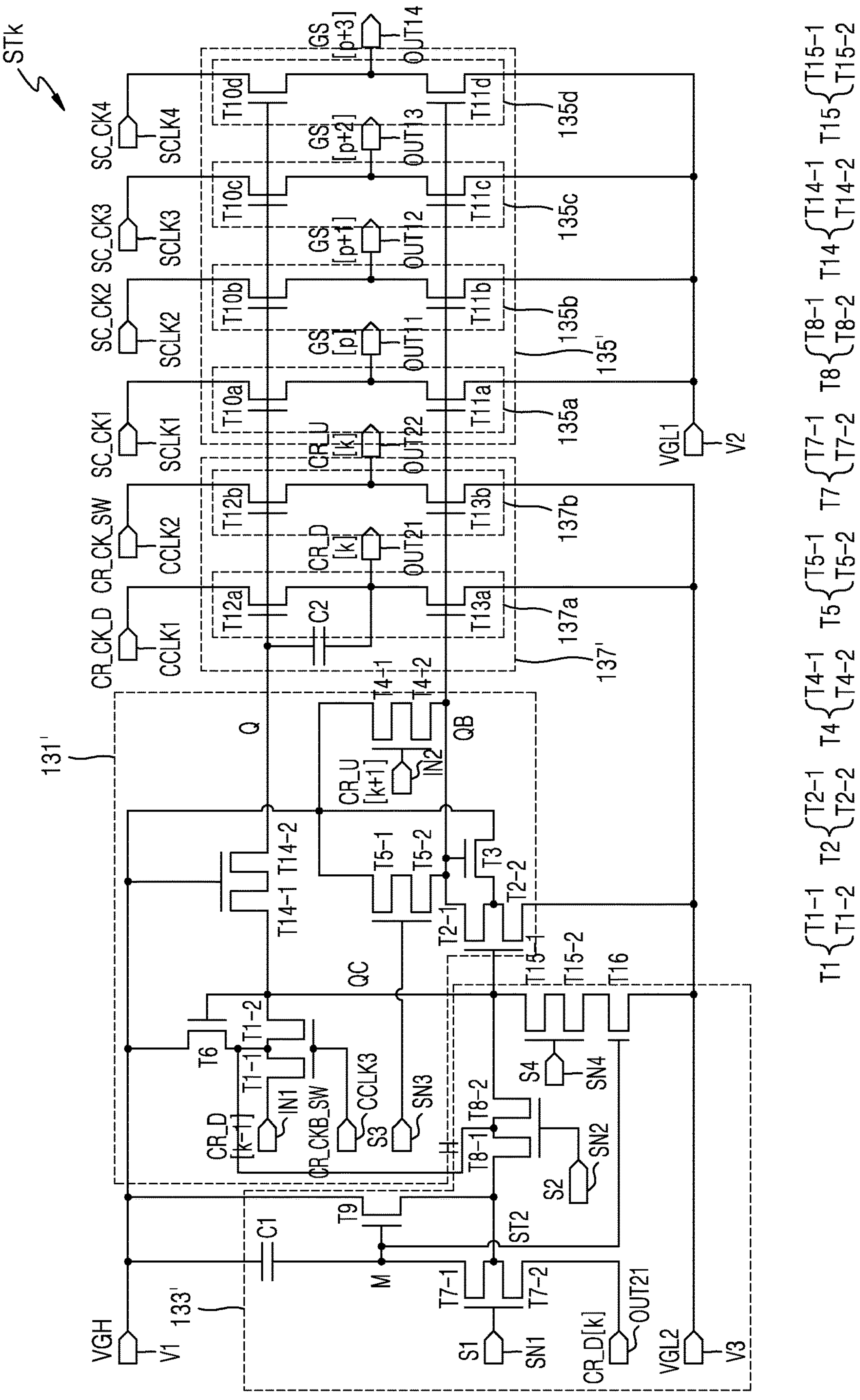
FIG. 15 is a circuit diagram illustrating an example of a stage included in a gate driving circuit according to an embodiment.
Figure 16:
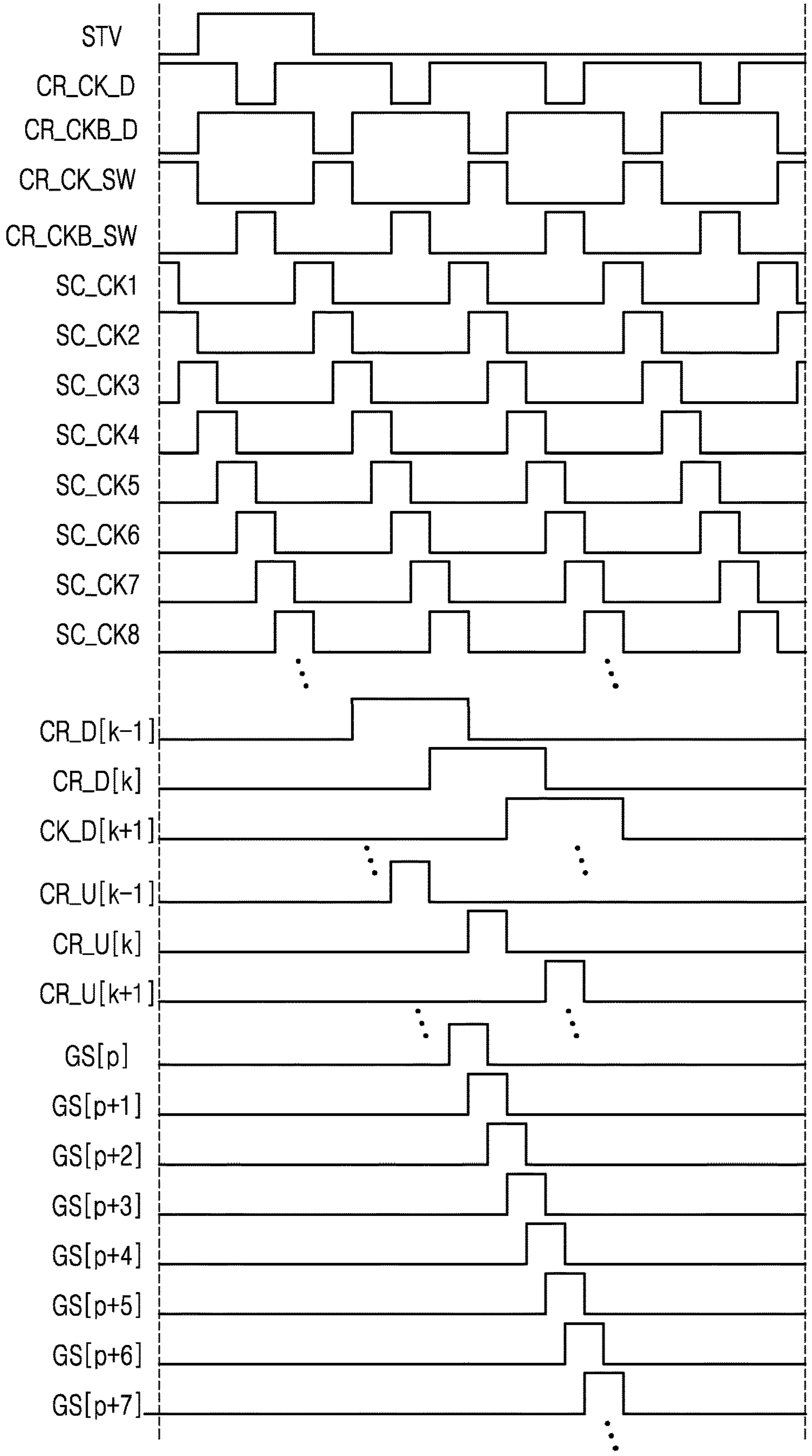
FIGS. 16, 17A, 17B, and 18 are diagrams illustrating signals for explaining driving of the stage of FIG. 15.

FIG. 13 is a schematic diagram of a gate driving circuit 130*c* according to an embodiment. FIG. 14 is a schematic diagram of one stage of the gate driving circuit 130*c* shown in FIG. 13. FIG. 15 is a circuit diagram illustrating an example of a stage included in a gate driving circuit according to an embodiment. FIGS. 16 to 18 are diagrams illustrating signals for explaining driving of the stage of FIG. 15. Hereinafter, configurations different from those described with reference to FIGS. 3 to 12 will be mainly described.

Each of the plurality of stages ST1 to STn of the gate driving circuit 130*c* according to an embodiment may generate two or more gate signals corresponding to two or more rows and output the generated two or more gate signals to two or more gate lines corresponding thereto. For example, as shown in FIG. 13, each of the plurality of stages ST1 to STn may generate four gate signals and sequentially output the four gate signals to four gate lines of corresponding four rows. In this case, the number of stages may be ¼ of the number of rows (horizontal lines) provided in the pixel portion 110.

Referring to FIGS. 13 and 14, each of the plurality of stages ST1 to STn of the gate driving circuit 130*c* may include a first input terminal IN1, a second input terminal IN2, a first voltage input terminal V1, a second voltage input terminal V2, a third voltage input terminal V3, a first carry clock terminal CCLK1, a second carry clock terminal CCLK2, a third carry clock terminal CCLK3, a scan clock terminal SCLK, a first control signal terminal SN1, a second control signal terminal SN2, a third control signal terminal SN3, a fourth control signal terminal SN4, a first output terminal OUT1, and a second output terminal OUT2.

A plurality of first output terminals OUT1 may be provided to output a plurality of gate signals. For example, each stage may include 1st-1 to 1st-4 output terminals OUT11 to OUT14 to output four gate signals. The first output terminals OUT1 may include 1st-1 output terminals OUT11, 1st-2 output terminals OUT12, 1st-3 output terminals OUT13 and 1st-4 output terminals OUT14. A plurality of scan clock terminals SCLK may be provided to correspond to the plurality of first output terminals OUT1. For example, each stage may include first to fourth scan clock terminals SCLK1 to SCLK4. The second output terminal OUT2 may include a 2nd-1 output terminal OUT21 outputting a carry signal to a next stage and a 2nd-2 output terminal OUT22 outputting a carry signal to a previous stage.

Each of the plurality of stages ST1 to STn may generate a down carry signal (first carry signal) and supply the down carry signal to the first input terminal IN1 of the next stage and may generate an up carry signal (second carry signal) and supply the up carry signal to the second input terminal IN2 of the previous stage. For example, as shown in FIG. 14, a (k−1)-th down carry signal CR_D[k−1] output from the 2nd-1 output terminal OUT21 of a (k−1)-th stage may be input to the first input terminal IN1 of a k-th stage STk. A (k+1)-th up carry signal CR_U[k+1] output from the 2nd-2 output terminal OUT22 of a (k+1)-th stage may be input to the second input terminal IN2 of the k-th stage STk.

A first voltage VGH may be input to the first voltage input terminal V1, a second voltage VGL1 may be input to the second voltage input terminal V2, and a third voltage VGL2 may be input to the third voltage input terminal V3.

A driving carry clock signal may be input to the first carry clock terminal CCLK1. The driving carry clock signal may include a first driving carry clock signal CR_CK_D and a second driving carry clock signal CR_CKB_D. The first driving carry clock signal CR_CK_D or the second driving carry clock signal CR_CKB_D may be input to the first carry clock terminal CCLK1. The first driving carry clock signal CR_CK_D and the second driving carry clock signal CR_CKB_D may be alternately input to the first carry clock terminals CCLK1 of the stages ST1 to STn. For example, the first driving carry clock signal CR_CK_D may be input to the first carry clock terminal CCLK1 of odd-numbered stages ST1, ST3, . . . . For example, the second driving carry clock signal CR_CKB_D may be input to the first carry clock terminal CCLK1 of even-numbered stages ST2, ST4, . . . .

The first driving carry clock signal CR_CK_D and the second driving carry clock signal CR_CKB_D may be square wave signals repeating a high-level voltage and a low-level voltage. The first driving carry clock signal CR_CK_D and the second driving carry clock signal CR_CKB_D may have the same waveform and may be phase-shifted signals. For example, the second driving carry clock signal CR_CKB_D may have the same waveform as the first driving carry clock signal CR_CK_D and may be input by being phase-shifted (phase-delayed) at a certain interval. The second driving carry clock signal CR_CKB_D may be shifted by a half cycle from the first driving carry clock signal CR_CK_D. The gate-on voltage period of each of the first driving carry clock signal CR_CK_D and the second driving carry clock signal CR_CKB_D may be set to be longer than the gate-off voltage period thereof in one cycle. However, the disclosure is not limited thereto, and the gate-on voltage period of each of the first driving carry clock signal CR_CK_D and the second driving carry clock signal CR_CKB_D may be equal to or shorter than the gate-off voltage period thereof in one cycle. The gate-on voltage of each of the first driving carry clock signal CR_CK_D and the second driving carry clock signal CR_CKB_D may be 18V, and the gate-off voltage thereof may be −10V. However, the disclosure is not limited thereto.

The gate-on voltage and the gate-off voltage of each of the first driving carry clock signal CR_CK_D and the second driving carry clock signal CR_CKB_D may be alternately input in a display period DP, and the gate-off voltage of each of the first driving carry clock signal CR_CK_D and the second driving carry clock signal CR_CKB_D may be input in a vertical blank period VBP.

A switching carry clock signal may be input to the second carry clock terminal CCLK2. The switching carry clock signal may include a first switching carry clock signal CR_CK_SW and a second switching carry clock signal CR_CKB_SW. The first switching carry clock signal CR_CK_SW or the second switching carry clock signal CR_CKB_SW may be input to the second carry clock terminal CCLK2. The first switching carry clock signal CR_CK_SW and the second switching carry clock signal CR_CKB_SW may be alternately input to the second carry clock terminal CCLK2 of the stages ST1 to STn. For example, the first switching carry clock signal CR_CK_SW may be input to the second carry clock terminal CCLK2 of odd-numbered stages ST1, ST3, . . . . The second switching carry clock signal CR_CKB_SW may be input to the second carry clock terminal CCLK2 of even-numbered stages ST2, ST4, . . . .

The first switching carry clock signal CR_CK_SW or the second switching carry clock signal CR_CKB_SW may be input to the third carry clock terminal CCLK3. The second switching carry clock signal CR_CKB_SW and the first switching carry clock signal CR_CK_SW may be alternately input to the third carry clock terminal CCLK3 of the stages ST1 to STn. For example, the second switching carry clock signal CR_CKB_SW may be input to the third carry clock terminal CCLK3 of the odd-numbered stages ST1, ST3, . . . . The first switching carry clock signal CR_CK_SW may be input to the third carry clock terminal CCLK3 of the even-numbered stages ST2, ST4, . . . .

The first switching carry clock signal CR_CK_SW and the second switching carry clock signal CR_CKB_SW may be square wave signals repeating a high-level voltage and a low-level voltage. The first switching carry clock signal CR_CK_SW and the second switching carry clock signal CR_CKB_SW may have the same waveform and may be phase-shifted signals. For example, the second switching carry clock signal CR_CKB_SW may have the same waveform as the first switching carry clock signal CR_CK_SW and may be input with a phase shift (phase delay) at certain intervals. The second switching carry clock signal CR_CKB_SW may be shifted by a half cycle from the first switching carry clock signal CR_CK_SW. The gate-on voltage period of each of the first switching carry clock signal CR_CK_SW and the second switching carry clock signal CR_CKB_SW may be set to be shorter than the gate-off voltage period thereof in one cycle. However, the disclosure is not limited thereto, and the gate-on voltage period of each of the first switching carry clock signal CR_CK_SW and the second switching carry clock signal CR_CKB_SW may be set to be equal to or longer than the gate-off voltage period thereof in one cycle. The gate-on voltage of the first switching carry clock signal CR_CK_SW and the second switching carry clock signal CR_CKB_SW may be 20V, and the gate-off voltage thereof may be −12V. However, the disclosure is not limited thereto.

The gate-on voltage and the gate-off voltage of each of the first switching carry clock signal CR_CK_SW and the second switching carry clock signal CR_CKB_SW may be alternately input in the display period DP, and the gate off voltage of each of the first switching carry clock signal CR_CK_SW and the second switching carry clock signal CR_CKB_SW may be input in the vertical blank period VBP.

A period in which the first driving carry clock signal CR_CK_D is at the gate-on voltage may overlap a period in which the first switching carry clock signal CR_CK_SW is at the gate-on voltage. A period in which the second driving carry clock signal CR_CKB_D is at the gate-on voltage may overlap a period in which the second switching carry clock signal CR_CKB_SW is at the gate-on voltage. A period in which the first switching carry clock signal CR_CK_SW is at the gate-on voltage may be shorter than a period in which the first driving carry clock signal CR_CK_D is at the gate-on voltage. A period in which the second switching carry clock signal CR_CKB_SW is at the gate-on voltage may be shorter than a period in which the second driving carry clock signal CR_CKB_D is at the gate-on voltage.

Each of the plurality of stages ST1 to STn may include a plurality of scan clock terminals. One of the plurality of scan clock signals SC_CK may be input to each of the plurality of scan clock terminals. Each of the plurality of stages ST1 to STn may include i scan clock terminals and may receive i scan clock signals SC_CK among 2i scan clock signals SC_CK. Here, i may be an integer greater than or equal to 2.

In an embodiment, each stage may include first to fourth scan clock terminals SCLK1 to SCLK4, and four scan clock signals among first to eighth scan clock signals SC_CK1 to SC_CK8 may be input to the first to fourth scan clock terminals SCLK1 to SCLK4, respectively. For example, the first to fourth scan clock signals SC_CK1 to SC_CK4 may be sequentially input to the first to fourth scan clock terminals SCLK1 to SCLK4 of the odd-numbered stages ST1, ST3, . . . . The fifth to eighth scan clock signals SC_CK5 to SC_CK8 may be sequentially input to the first to fourth scan clock terminals SCLK1 to SCLK4 of the even-numbered stages ST2, ST4, . . . .

The eight first to eighth scan clock signals SC_CK1 to SC_CK8 may be square wave signals repeating a high-level voltage and a low-level voltage. The first to eighth scan clock signals SC_CK1 to SC_CK8 may have the same waveform and may be phase-shifted signals. The phases of the first to eighth scan clock signals SC_CK1 to SC_CK8 may be sequentially shifted so that the gate-on voltage periods thereof partially overlap each other and be supplied to the gate driving circuit 130*c*. The gate-on voltage period of each of the first to eighth scan clock signals SC_CK1 to SC_CK8 may be set to be shorter than the gate-off voltage period thereof in one cycle. However, the disclosure is not limited thereto, and the gate-on voltage period of each of the first to eighth scan clock signals SC_CK1 to SC_CK8 may be set to be equal to or longer than the gate-off voltage period thereof in one cycle. The gate-on voltage of each of the first to eighth scan clock signals SC_CK1 to SC_CK8 may be 20V, and the gate-off voltage thereof may be −5V. However, the disclosure is not limited thereto.

The gate-on voltage and the gate-off voltage of each of the first to eighth scan clock signals SC_CK1 to SC_CK8 may be alternately input in the display period DP, and the gate-on voltage of each of the first to eighth scan clock signals SC_CK1 to SC_CK8 may be input in the sensing period SP.

The gate-on voltage period of the first driving carry clock signal CR_CK_D may overlap the gate-on voltage periods of the first to fourth scan clock signals SC_CK1 to SC_CK4. As shown in FIG. 16, the first to fourth scan clock signals SC_CK1 to SC_CK4 may sequentially have gate-on voltages within the gate-on voltage period of the first driving carry clock signal CR_CK_D. The fourth to eighth scan clock signals SC_CK4 to SC_CK8 may sequentially have gate-on voltages within the gate-on voltage period of the second driving carry clock signal CR_CKB_D. Accordingly, a plurality of gate signals may be stably output in response to a plurality of scan clock signals in one stage.

A first control signal S1 may be input to the first control signal terminal SN1. A second control signal S2 may be input to the second control signal terminal SN2. A third control signal S3 may be input to the third control signal terminal SN3.

A fourth control signal S4 may be input to the fourth control signal terminal SN4. The fourth control signal S4 may be supplied to discharge (reset) the voltage of the first control node Q before and/or after the sensing period SP in the vertical blank period VBP.

Each of the plurality of stages ST1 to STn may include a plurality of first output terminals and may sequentially shift and output a plurality of gate signals by a certain period. The number of first output terminals may be the same as the number of scan clock signals input to each stage. For example, four scan clock signals may be input to each of the plurality of stages ST1 to STn, and each stage may include four first output terminals. As shown in FIG. 14, in the k-th stage STk, a p-th gate signal GS[p] may be output from the 1st-1 output terminal OUT11 to a p-th gate line, a (p+1)-th gate signal GS[p+1] may be output from the 1st-2 output terminal OUT12 to a (p+1)-th gate line, a (p+2)-th gate signal GS[p+2] may be output from the 1st-3 output terminal OUT13 to a (p+2)-th gate line, and a (p+3)-th gate signal GS[p+3] may be output from the 1st-4 output terminal OUT14 to a (p+3)-th gate line. Here, p is a positive integer, and p+3 may be 4k.

Each of the plurality of stages ST1 to STn may include a 2nd-1 output terminal OUT21 and a 2nd-2 output terminal OUT22. A down carry signal may be output from the 2nd-1 output terminal OUT21, and an up carry signal may be output from the 2nd-2 output terminal OUT22. For example, as shown in FIG. 14, a k-th down carry signal CR_D[k] may be output from the 2nd-1 output terminal OUT21 of the k-th stage STk, and a k-th up carry signal CR_U[k] may be output from the 2nd-2 output terminal OUT22.

Referring to FIG. 15, the k-th stage STk may include a first controller 131', a second controller 133', a first output portion 135', and a second output portion 137'.

The first controller 131' may further include a fourteenth transistor T14 in addition to the first controller 131 shown in FIG. 7. The fourteenth transistor T14 may be connected between a third control node QC and the first control node Q. The fourteenth transistor T14 may include a plurality of sub-transistors connected in series. The sub-transistors may include a pair of transistors, that is, a 14th-1 transistor T14-1 and a 14th-2 transistor T14-2. Gates of the 14th-1 transistor T14-1 and the 14th-2 transistor T14-2 may be connected to the first voltage input terminal V1. The fourteenth transistor T14 may be turned on by a first voltage VGH applied to the first voltage input terminal V1 and may connect the third control node QC to the first control node Q.

The fourteenth transistor T14 may be always turned on. The fourteenth transistor T14 may prevent a line voltage drop between nodes to which both terminals of the fourteenth transistor T14 are connected. For example, the fourteenth transistor T14 may prevent a line voltage drop between the third control node QC and the first control node Q.

The second controller 133' may further include a fifteenth transistor T15 and a sixteenth transistor T16 in addition to the second controller 133 shown in FIG. 7.

The fifteenth transistor T15 may be connected between the third control node QC and the third voltage input terminal V3. The fifteenth transistor T15 may include a plurality of sub-transistors connected in series. The sub-transistors may include a pair of transistors, that is, a 15th-1 transistor T15-1 and a 15th-2 transistor T15-2. Gates of the 15th-1 transistor T15-1 and the 15th-2 transistor T15-2 may be connected to the fourth control signal terminal SN4. The fifteenth transistor T15 may be turned on by a fourth control signal S4 applied to the fourth control signal terminal SN4.

The sixteenth transistor T16 may be connected between the fifteenth transistor T15 and the third voltage input terminal V3. A gate of the sixteenth transistor T16 may be connected to the sensing node M. The sixteenth transistor T16 may be turned on when the sensing node M is at the first level voltage, and when the fifteenth transistor T15 is turned on when the fourth control signal S4 is supplied, the voltages of the third control node QC and the first control node Q may be set to a third voltage VGL2.

The first output portion 135' may include a plurality of sub-output portions, and one of a plurality of scan clock signals may be input to a scan clock terminal of each of the plurality of sub-output portions. The plurality of scan clock signals may be signals having the same waveform and shifted in phase by a certain interval. In an embodiment, the first output portion 135' may include first to fourth sub-output portions 135*a*, 135*b*, 135*c*, and 135*d*. Each of the first to fourth sub-output portions 135*a*, 135*b*, 135*c*, and 135*d* may include a tenth transistor and an eleventh transistor.

The first sub-output portion 135*a* may include a 10th-1 transistor T10*a* and an 11th-1 transistor T11*a*. The 10th-1 transistor T10*a* may be connected between the first scan clock terminal SCLK1 and the 1st-1 output terminal OUT11. A gate of the 10th-1 transistor T10*a* may be connected to the first control node Q. The 10th-1 transistor T10*a* may be turned on or off in response to the voltage of the first control node Q. The 10th-1 transistor T10*a* may be turned on when the voltage of the first control node Q is set to the first level voltage, and thus may output the first level voltage of the first scan clock signal SC_CK1 as the first level voltage of the p-th gate signal GS[p] or output the second level voltage of the first scan clock signal SC_CK1 as the second level voltage of the p-th gate signal GS[p]. The 11th-1 transistor T11*a* may be connected between the 1st-1 output terminal OUT11 and the second voltage input terminal V2. A gate of the 11th-1 transistor T11*a* may be connected to the second control node QB. The 11th-1 transistor T11*a* may be turned on or off in response to the voltage of the second control node QB. The 11th-1 transistor T11*a* may be turned on when the voltage of the second control node QB is set to the first level voltage, and thus may output the second voltage VGL1 as the second level voltage of the p-th gate signal GS[p].

The second sub-output portion 135*b* may include a 10th-2 transistor T10*b* and an 11th-2 transistor T11*b*. The 10th-2 transistor T10*b* may be connected between the second scan clock terminal SCLK2 and the 1st-2 output terminal OUT12. A gate of the 10th-2 transistor T10*b* may be connected to the first control node Q. The 10th-2 transistor T10*b* may be turned on or off in response to the voltage of the first control node Q. The 10th-2 transistor T10*b* may be turned on when the voltage of the first control node Q is set to the first level voltage, and thus may output the first level voltage of the second scan clock signal SC_CK2 as the first level voltage of the (p+1)-th gate signal GS[p+1] or output the second level voltage of the second scan clock signal SC_CK2 as the second level voltage of the (p+1)-th gate signal GS[p+1]. The 11th-2 transistor T11*b* may be connected between the 1st-2 output terminal OUT12 and the second voltage input terminal V2. A gate of the 11th-2 transistor T11*b* may be connected to the second control node QB. The 11th-2 transistor T11*b* may be turned on or off in response to the voltage of the second control node QB. The 11th-2 transistor T11*b* may be turned on when the voltage of the second control node QB is set to the first level voltage, and thus may output the second voltage VGL1 as the second level voltage of the (p+1)-th gate signal GS[p+1].

The third sub-output portion 135*c* may include a 10th-3 transistor T10*c* and an 11th-3 transistor T11*c*. The 10th-3 transistor T10*c* may be connected between the third scan clock terminal SCLK3 and the 1st-3 output terminal OUT13. A gate of the 10th-3 transistor T10*c* may be connected to the first control node Q. The 10th-3 transistor T10*c* may be turned on or off in response to the voltage of the first control node Q. The 10th-3 transistor T10*c* may be turned on when the voltage of the first control node Q is set to the first level voltage, and thus may output the first level voltage of the third scan clock signal SC_CK3 as the first level voltage of the (p+2)-th gate signal GS[p+2]) or output the second level voltage of the third scan clock signal SC_CK3 as the second level voltage of the (p+2)-th gate signal GS[p+2]. The 11th-3 transistor T11*c* may be connected between the 1 st-3 output terminal OUT13 and the second voltage input terminal V2. A gate of the 11th-3 transistor T11*c* may be connected to the second control node QB. The 11th-3 transistor T11*c* may be turned on or off in response to the voltage of the second control node QB. The 11th-3 transistor T11*c* may be turned on when the voltage of the second control node QB is set to the first level voltage, and thus may output the second voltage VGL1 as the second level voltage of the (p+2)-th gate signal GS[p+2].

The fourth sub-output portion 135*d* may include a 10th-4 transistor T10*d* and an 11th-4 transistor T11*d*. The 10th-4 transistor T10*d* may be connected between the fourth scan clock terminal SCLK4 and the 1st-4 output terminal OUT14. A gate of the 10th-4 transistor T10*d* may be connected to the first control node Q. The 10th-4 transistor T10*d* may be turned on or off in response to the voltage of the first control node Q. The 10th-4 transistor T10*d* may be turned on when the voltage of the first control node Q is set to the first level voltage, and thus may output the first level voltage of the fourth scan clock signal SC_CK4 as the first level voltage of the (p+3)-th gate signal GS[p+3]) or output the second level voltage of the fourth scan clock signal SC_CK4 as the second level voltage of the (p+3)-th gate signal GS[p+3]. The 11th-4 transistor T11*d* may be connected between the 1 st-4 output terminal OUT14 and the second voltage input terminal V2. A gate of the 11th-4 transistor T11*d* may be connected to the second control node QB. The 11th-4 transistor T11*d* may be turned on or off in response to the voltage of the second control node QB. The 11th-4 transistor T11*d* may be turned on when the voltage of the second control node QB is set to the first level voltage, and thus may output the second voltage VGL1 as the second level voltage of the (p+3)-th gate signal GS[p+3].

The second output portion 137' may include a first sub-output portion 137*a* and a second sub-output portion 137*b*. The first sub-output portion 137*a* may output a down carry signal to a next stage, the down carry signal being synchronized with a driving carry clock signal input to the first carry clock terminal CCLK1 of the first sub-output portion 137*a*. The second sub-output portion 137*b* may output an up carry signal to a previous stage, the up carry signal being synchronized with a switching carry clock signal input to the second carry clock terminal CCLK2 of the second sub-output portion 137*b*.

Each of the first sub-output portion 137*a* and the second sub-output portion 137*b* may include a twelfth transistor and a thirteenth transistor.

The first sub-output portion 137*a* may include a 12th-1 transistor T12*a* and a 13th-1 transistor T13*a*. The 12th-1 transistor T12*a* may be connected between the first carry clock terminal CCLK1 and the 2nd-1 output terminal OUT21. A gate of the 12th-1 transistor T12*a* may be connected to the first control node Q. The 12th-1 transistor T12*a* may be turned on or off in response to the voltage of the first control node Q. The 12th-1 transistor T12*a* may be turned on when the voltage of the first control node Q is set to the first level voltage, and thus may output the first level voltage of the first driving carry clock signal CR_CK_D as the first level voltage of the k-th down carry signal CR_D[k] or output the second level voltage of the first driving carry clock signal CR_CK_D as the second level voltage of the k-th down carry signal CR_D[k]. The 13th-1 transistor T13*a* may be connected between the 2nd-1 output terminal OUT21 and the third voltage input terminal V3. A gate of the 13th-1 transistor T13*a* may be connected to the second control node QB. The 13th-1 transistor T13*a* may be turned on or off in response to the voltage of the second control node QB. The 13th-1 transistor T13*a* may be turned on when the voltage of the second control node QB is set to the first level voltage, and thus may output the third voltage VGL2 as the second level voltage of the k-th down carry signal CR_D[k].

The second sub-output portion 137*b* may include a 12th-2 transistor T12*b* and a 13th-2 transistor T13*b*. The 12th-2 transistor T12*b* may be connected between the second carry clock terminal CCLK2 and the 2nd-2 output terminal OUT22. A gate of the 12th-2 transistor T12*b* may be connected to the first control node Q. The 12th-2 transistor T12*b* may be turned on or off in response to the voltage of the first control node Q. The 12th-2 transistor T12*a* may be turned on when the voltage of the first control node Q is set to the first level voltage, and thus may output the first level voltage of the first switching carry clock signal CR_CK_SW as the first level voltage of the k-th up carry signal CR_U[k] or output the second level voltage of the first switching carry clock signal CR_CK_SW as the second level voltage of the k-th up carry signal CR_U[k]. The 13th-2 transistor T13*b* may be connected between the 2nd-2 output terminal OUT22 and the third voltage input terminal V3. A gate of the 13th-2 transistor T13*b* may be connected to the second control node QB. The 13th-2 transistor T13*b* may be turned on or off in response to the voltage of the second control node QB. The 13th-2 transistor T13*b* may be turned on when the voltage of the second control node QB is set to the first level voltage, and thus may output the third voltage VGL2 as the second level voltage of the k-th up carry signal CR_U[k].

The second capacitor C2 may be connected between the 12th-1 transistor T12*a* of the first sub-output portion 137*a* and the 2nd-1 output terminal OUT21. By connecting the second capacitor C2 to the first sub-output portion 137*a* that outputs the down carry signal CR_D having a long gate-on voltage period, the stable multi-output of a gate signal may be possible.

Hereinafter, the operation of the k-th stage STk will be described with reference to FIGS. 17A and 17B.

Figure 17A:
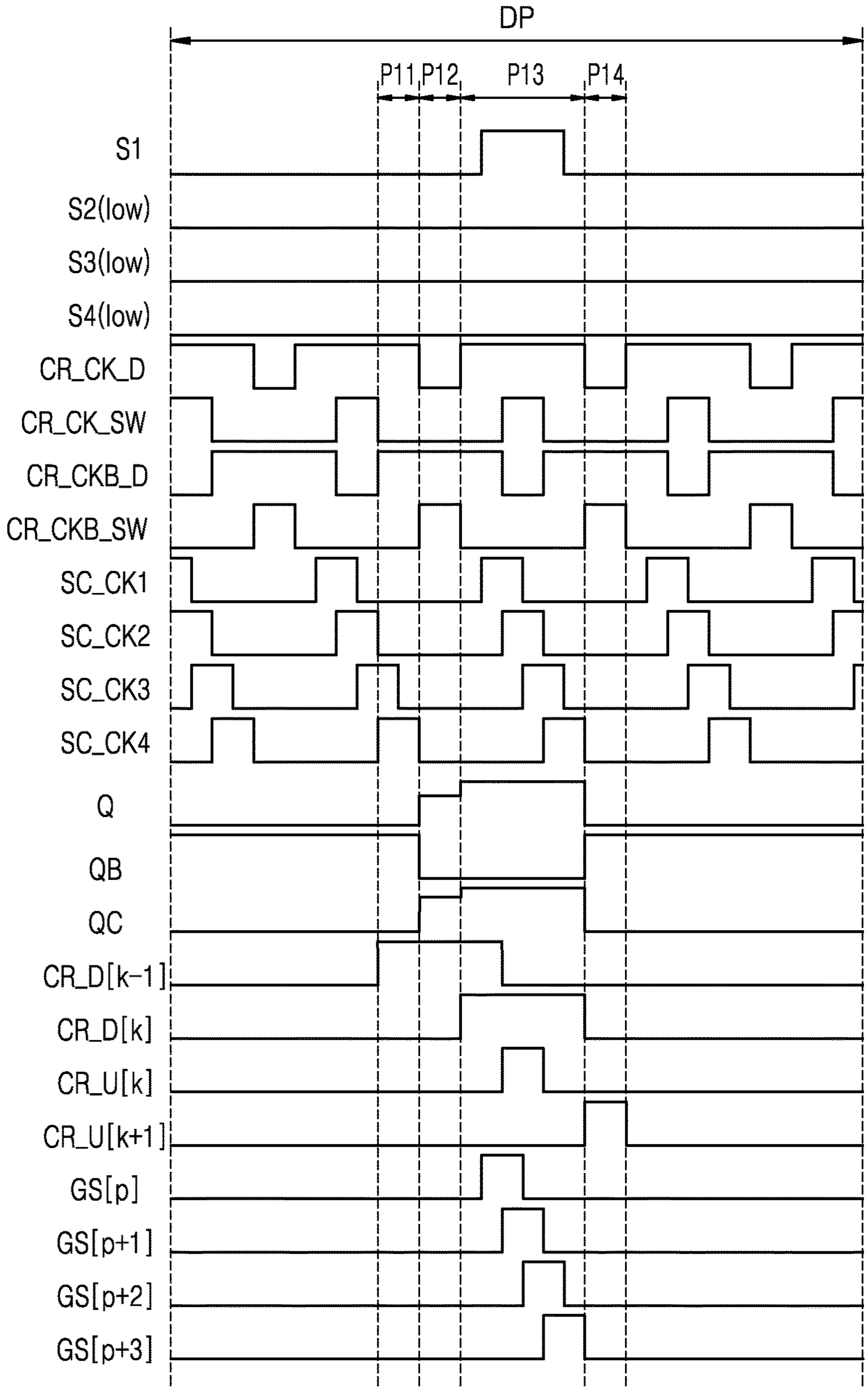
Figure 18:
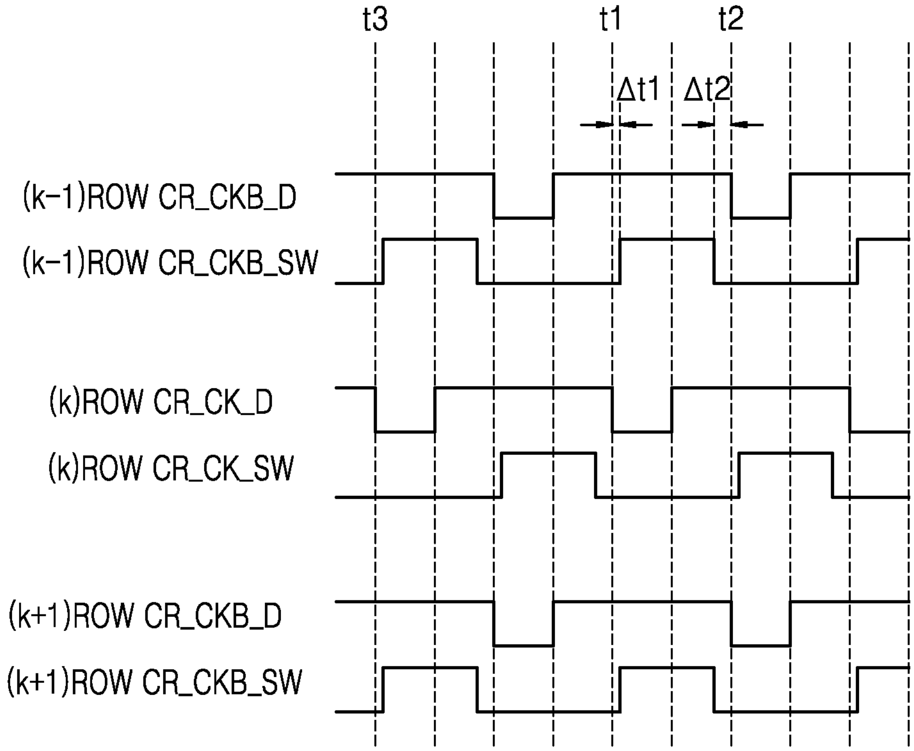

FIG. 17A shows the operation of the k-th stage STk in the display period DP.

In a first period P11, the previous down carry signal CR_D[k−1] of the first level voltage from the (k−1)-th stage that is a previous stage may be supplied, and the next up carry signal CR_U[k+1] of the second level voltage from the (k+1)-th stage that is a next stage may be supplied. In addition, the first driving carry clock signal CR_CK_D of the first level voltage may be supplied, and the first switching carry clock signal CR_CK_SW of the second level voltage and the second switching carry clock signal CR_CKB_SW of the second level voltage may be supplied. The voltage of the first control node Q may be maintained at the second level voltage, and the voltage of the second control node QB may be maintained at the first level voltage.

In a second period P12, the previous down carry signal CR_D[k−1] of the first level voltage may be supplied, and the next up carry signal CR_U[k+1] of the second level voltage may be supplied. In addition, the first driving carry clock signal CR_CK_D of the second level voltage and the first switching carry clock signal CR_CK_SW of the second level voltage may be supplied and the first to fourth scan clock signals SC_CK1 to SC_CK4 of the second level voltage may be supplied.

The first transistor T1 may be turned on by the second switching carry clock signal CR_CKB_SW having the first level voltage, and the first control node Q and the third control node QC may be set to the first level voltage of the previous down carry signal CR_D[k−1]. Accordingly, the 10th-1 to 10th-4 transistors T10*a*, T10*b*, T10*c*, and T10*d* may be turned on, and thus, the second level voltages of the first to fourth scan clock signals SC_CK1, SC_CK2, SC_CK3, and SC_CK4 may be output from the 1st-1 to 1st-4 output terminals OUT11 to OUT14 as the p-th to (p+3)-th gate signals GS[p] to GS[p+3], respectively. In addition, the 12th-1 transistor T12*a* may be turned on, and thus, the second level voltage of the first driving carry clock signal CR_CK_D may be output as the k-th down carry signal CR_D[k] from the 2nd-1 output terminal OUT21. The 12th-2 transistor T12*b* may be turned on, and thus, the second level voltage of the first switching carry clock signal CR_CK_SW may be output as the k-th up carry signal CR_U[k] from the 2nd-2 output terminal OUT22.

The second transistor T2, the gate of which is connected to the third control node QC, may be turned on, and the voltage of the second control node QB may be set to the second level voltage of the third voltage VGL2. Accordingly, the 11th-1 to 11th-4 transistors T11*a*, T11*b*, T11*c*, and T11*d*, the 13th-1 transistor T13*a*, and the 13th-2 transistor T13*b* may remain turned off.

In the third period P13, the previous down carry signal CR_D[k−1] of the first level voltage may be supplied and then transitioned to the second level voltage, and the next up carry signal CR_U[k+1] of the second level voltage may be supplied. The first driving carry clock signal CR_CK_D of the first level voltage may be supplied, the first switching carry clock signal CR_CK_SW may be sequentially transitioned to and supplied as the second level voltage, the first level voltage, and the second level voltage, and the second switching carry clock signal CR_CKB_SW of the second level voltage may be supplied. The first to fourth scan clock signals SC_CK1 to SC_CK4 of the first level voltage may be sequentially supplied.

The first transistor T1 may be turned off by the second switching carry clock signal CR_CKB_SW having the second level voltage, and the voltage of the first control node Q and the third control node QC may be maintained at the first level voltage. The first level voltages of the first to fourth scan clock signals SC_CK1, SC_CK2, SC_CK3, and SC_CK4 may be sequentially shifted and output as the p-th to (p+3)-th gate signals GS[p] to GS[p+3] from the 1st-1 to 1st-4 output terminals OUT11 to OUT14 through the turned-on 10th-1 to 10th-4 transistors T10*a*, T10*b*, T10*c*, and T10*d*, respectively. In addition, the first level voltage of the first driving carry clock signal CR_CK_D may be output as the k-th down carry signal CR_D[k] from the 2nd-1 output terminal OUT21 through the turned-on 12th-1 transistor T12*a*. The 12th-2 transistor T12*b* may be turned on, and thus, voltages corresponding to the second level voltage, the first level voltage, and the second level voltage of the first switching carry clock signal CR_CK_SW may be sequentially output as the k-th up carry signal CR_U[k] from the 2nd-2 output terminal OUT22. In this case, the voltage of the first control node Q may be boosted to a higher voltage than the voltage in the second period P12 by the second capacitor C2.

The sixth transistor T6, the gate of which is connected to the third control node QC, may be turned on and the first voltage VGH may be transferred to an intermediate node H between the 1st-1 transistor T1-1 and the 1st-2 transistor T1-2, and thus, the voltage of the third control node QC may be stably maintained by blocking leakage current caused by the turned-off 1st-1 transistor T1-1 and 1st-2 transistor T1-2.

The voltage of the second control node QB may be maintained at the second level voltage of the third voltage VGL2.

In a fourth period P14, the previous down carry signal CR_D[k−1] of the second level voltage may be supplied, and the next up carry signal CR_U[k+1] of the first level voltage may be supplied. The first driving carry clock signal CR_CK_D of the second level voltage may be supplied, the first switching carry clock signal CR_CK_SW of the second level voltage may be supplied, and the second switching carry clock signal CR_CKB_SW of the first level voltage may be supplied. The first to fourth scan clock signals SC_CK1 to SC_CK4 of the second level voltage may be supplied.

The first transistor T1 may be turned on by the second switching carry clock signal CR_CKB_SW having the first level voltage, and the voltages of the first control node Q and the third control node QC may be set to the second level voltage of the previous down carry signal CR_D[k−1]. Accordingly, the 10th-1 to 10th-4 transistors T10*a*, T10*b*, T10*c*, and T10*d*, the 12th-1 transistor T12*a*, the 12th-2 transistor T12*b*, and the second transistor T2 may be turned off.

The fourth transistor T4 may be turned on by the next up carry signal CR_U[k+1], and the voltage of the second control node QB may be set to the first voltage VGH through the turned-on fourth transistor T4. Accordingly, the 11th-1 to 11th-4 transistors T11*a*, T11*b*, T11*c*, and T11*d*, the 13th-1 transistor T13*a*, and the 13th-2 transistor T13*b* may be turned on. The second level voltage of the second voltage VGL1 may be output as the p-th to (p+3)-th gate signals GS[p] to GS[p+3] from the 1st-1 to 1st-4 output terminals OUT11 to OUT14, respectively, through the turned-on 11th-1 to 11th-4 transistors T11*a*, T11*b*, T11*c*, and T11*d*. The second level voltage of the third voltage VGL2 may be output as the k-th down carry signal CR_D[k] from the 2nd-1 output terminal OUT21 through the turned-on 13th-1 transistor T13*a*. The second level voltage of the third voltage VGL2 may be output as the k-th up carry signal CR_U[k] from the 2nd-2 output terminal OUT22 through the turned-on 13th-2 transistor T13*b*.

The sixth transistor T6, the gate of which is connected to the third control node QC, may be turned on and the first voltage VGH may be transferred to an intermediate node H between the 2nd-1 transistor T2-1 and the 2nd-2 transistor T2-2, and thus, the voltage of the second control node QB may be stably maintained by blocking leakage current caused by the turned-off 2nd-1 transistor T2-1 and 2nd-2 transistor T2-2.

The k-th down carry signal CR_D[k] and the first control signal S1 may be supplied to the second controller 133' during the display period DP. As the first control signal S1 is supplied, the seventh transistor T7 may be turned on, the first level voltage of the k-th down carry signal CR[k] may be supplied to the sensing node M, and the first capacitor C1 may be charged. The ninth transistor T9 having a gate connected to the sensing node M may be turned on.

Figure 17B:
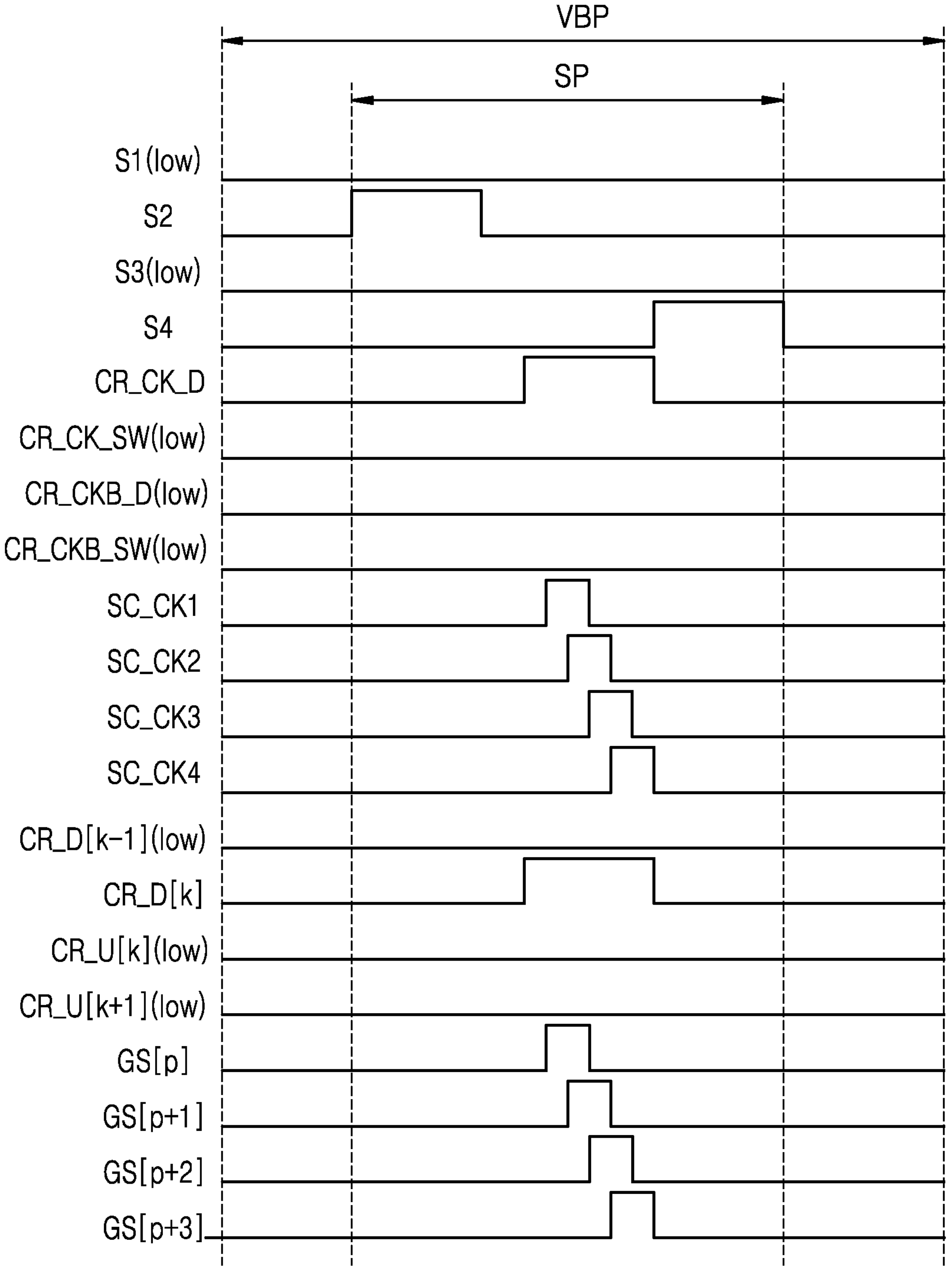

FIG. 17B shows the operation of the k-th stage STk in the vertical blank period VBP. In a sensing period SP of the vertical blank period VBP, the first driving carry clock signal CR_CK_D of the first level voltage may be supplied, the first switching carry clock signal CR_CK_SW of the second level voltage and the second switching carry clock signal CR_CKB_SW of the second level voltage may be supplied, and the first to fourth scan clock signals SC_CK1 to SC_CK4 of the first level voltage may be sequentially supplied. When a stage connected to a pixel to be sensed is an even stage, the second driving carry clock signal CR_CKB_D of the first level voltage may be supplied.

The second control signal S2 may be supplied to the second controller 133', and the voltage of the first control node Q and the third control node QC may be set to the first voltage VGH through the ninth transistor T9, which has a gate connected to the sensing node M having the first level voltage and thus turned on, and the eight transistor T8 turned on by the second control signal S2. Accordingly, the 10th-1 to 10th-4 transistors T10*a*, T10*b*, T10*c*, and T10*d*, the 12th-1 transistor T12*a*, the 12th-2 transistor T12*b*, and the second transistor T2 may be turned on. The first level voltages of the first to fourth scan clock signals SC_CK1, SC_CK2, SC_CK3, and SC_CK4 may be sequentially shifted and output as the p-th to (p+3)-th gate signals GS[p] to GS[p+3] from the 1st-1 to 1st-4 output terminals OUT11 to OUT14 through the turned-on 10th-1 to 10th-4 transistors T10*a*, T10*b*, T10*c*, and T10*d*, respectively. In addition, the first level voltage of the first driving carry clock signal CR_CK_D may be output as the k-th down carry signal CR_D[k] from the 2nd-1 output terminal OUT21 through the turned-on 12th-1 transistor T12*a*. The second level voltage of the first switching carry clock signal CR_CK_SW may be output as the k-th up carry signal CR_U[k] from the 2nd-2 output terminal OUT22 through the turned-on 12th-2 transistor T12*b*. As a driving carry clock signal having the first level voltage is input to the second sub-output portion 137*a* to which the second capacitor C2 is connected in the sensing period SP, the voltage of the first control node Q and the third control node QC may be boosted by the second capacitor C2 and thus a gate signal may be stably output.

Clock signals, i.e., a driving carry clock signal and a scan clock signal, having the first level voltage may be supplied after an arbitrary point in time while the second control signal S2 is supplied. FIG. 17B shows an example in which clock signals having the first level voltage are input at an arbitrary point in time after the first control node Q and the third control node QC is set to the first voltage VGH.

The second transistor M2 and the third transistor M3 of each of the pixels PX of the p-th to (p+3)-th rows receiving the p-th to (p+3)-th gate signals GS[p] to GS[p+3] may be turned on to thereby sense state information of the first transistor M1 and the organic light-emitting diode OLED.

FIG. 18 is a diagram illustrating a timing relationship between a carry clock signal and a switching carry clock signal, according to an embodiment.

FIG. 18 shows a second driving carry clock signal CR_CKB_D and a second switching carry clock signal CR_CKB_SW respectively input to the first carry clock terminal CCLK1 and the second carry clock terminal CCLK2 of the (k−1)-th stage corresponding to the (k−1)-th row, a second driving carry clock signal CR_CKB_D and a second switching carry clock signal CR_CKB_SW respectively input to the first carry clock terminal CCLK1 and the second carry clock terminal CCLK2 of the (k+1)-th stage corresponding to the (k+1)-th row, and a first driving carry clock signal CR_CK_D and a first switching carry clock signal CR_CK_SW respectively input to the first carry clock terminal CCLK1 and the second carry clock terminal CCLK2 of the k-th stage. The first switching carry clock signal CR_CK_SW may be input to the third carry clock terminal CCLK3 of each of the (k−1)-th stage and the (k+1)-th stage, and the second switching carry clock signal CR_CKB_SW may be input to the third carry clock terminal CCLK3 of the k-th stage. The second driving carry clock signal CR_CKB_D may be a phase shifted signal of the first driving carry clock signal CR_CK_D, and the second switching carry clock signal CR_CKB_SW may be a phase shifted signal of the first switching carry clock signal CR_CK_SW.

As shown in FIG. 15, a down carry signal CR_D[k] may be output in correspondence with the first driving carry clock signal CR_CK_D input to the k-th stage, and an up carry signal CR_U[k] may be output in correspondence with the first switching carry clock signal CR_CK_SW. A previous down carry signal CR_D[k−1] may be input to the k-th stage in correspondence with the second driving carry clock signal CR_CKB_D input to the (k−1)-th stage. A next up-carry signal CR_U[k+1] may be input to the k-th stage in correspondence with the second switching carry clock signal CR_CKB_SW input to the (k+1)-th stage.

The first transistor T1 may be turned on and off according to the voltage of the second switching carry clock signal CR_CKB_SW, and the turned-on first transistor T1 may set the voltage of the previous down carry signal CR_D[k−1] to the voltage of the first control node Q and the third control node QC. The fourth transistor T4 may be turned on and off according to the voltage of the next up carry signal CR_U [k+1], and the turned-on fourth transistor T4 may set the first voltage VGH to the voltage of the second control node QB.

Referring to FIG. 18, after a first point in time t1 at which the first driving carry clock signal CR_CK_D input to the k-th stage transitions from a gate-on voltage to a gate-off voltage, the second switching carry clock signal CR_CKB_SW input to the (k−1)-th stage may transition from the gate-off voltage to the gate-on voltage. Accordingly, in the (k+1)-th stage, the first control node Q may be stably reset to the second level voltage by the second level voltage of the previous down carry signal CR_D[k]. An interval Δt1 between the first point in time t1 and a point in time at which the second switching carry clock signal CR_CKB_SW transitions from the gate-off voltage to the gate-on voltage may be greater than or equal to zero.

Before the second point in time t2 at which the second driving carry clock signal CR_CKB_D input to the (k−1)-th stage transitions from the gate-on voltage to the gate-off voltage, the second switching carry clock signal CR_CKB_SW input to the (k−1)-th stage may transition from the gate-on voltage to the gate-off voltage. Accordingly, in the k-th stage, the first control node Q and the third control node QC may be stably charged by the first level voltage of the previous down carry signal CR_D[k−1]. An interval Δt2 between the second point in time t2 and a point in time at which the second switching carry clock signal CR_CKB_SW transitions from the gate-on voltage to the gate-off voltage may be greater than or equal to a phase delay between the first switching carry clock signal CR_CK_SW and the second switching carry clock signal CR_CKB_SW.

After a third point in time t3 at which the first driving carry clock signal CR_CK_D input to the k-th stage transitions from the gate-on voltage to the gate-off voltage, the second switching carry clock signal CR_CKB_SW input to the (k+1)-th stage may transition from the gate-off voltage to the gate-on voltage. Accordingly, the k-th stage may stably control the voltage control timing of the first control node Q, the third control node QC and the second control node QB.

In embodiments of the disclosure, the voltage level control timing of the first control node Q, the third control node QC and the second control node QB may be controlled by a carry signal output from a previous stage and a carry signal output from a next stage.

In a gate driving circuit including oxide semiconductor transistors, because the oxide semiconductor transistors operate in a depletion mode, when a threshold voltage distribution due to a negative shift of the threshold voltage of the transistors increase, it may be difficult for circuits to operate normally due to leakage current near 0V of the gate-source voltage (Vgs) in the transistors. Therefore, a method of reducing leakage current is required in order for the circuits to operate normally even with a negative shift of the threshold voltage. In embodiments of the disclosure, leakage current within a circuit may be reduced by providing a transistor, e.g., the sixth transistor T6 in FIG. 7, that supplies a first level voltage to an intermediate node between transistors, e.g., the first transistor T1 and the eighth transistor T8 in FIG. 7, that control the voltage of a first control node. Accordingly, embodiments of the disclosure may provide a gate driving circuit that is robust against defects caused by leakage current due to a negative shift in transistor threshold voltage.

In embodiments of the disclosure, as gate output portions that output two or more rows of gate signals share the first control node Q, second control node QB, and third control node QC in one stage, multi-output of a gate signal is possible, and the mounting area of the gate driving circuit may be reduced by reducing the total number of transistors in the gate driving circuit. According to embodiments of the disclosure, a plurality of gate signals may be generated in one stage by driving the on-duties of the first driving carrier clock signal CR_CK_D and the second driving carrier clock signal CR_CKB_D to 50% or more.

According to embodiments of the disclosure, a gate driving circuit capable of stably outputting a gate signal and a display apparatus including the gate driving circuit may be provided. The effects of the disclosure are not limited to the above effects, and may be variously extended without departing from the spirit of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A gate driving circuit comprising a plurality of stages, wherein each of the plurality of stages comprises:

a first controller connected to a first voltage input terminal and a second voltage input terminal and configured to control voltages of a first control node and a second control node during a display period of one frame;

a first output portion connected to a first clock terminal and a third voltage input terminal and configured to output a gate signal; and a second output portion connected to a second clock terminal and the second voltage input terminal and configured to output a carry signal, wherein the first controller comprises:

a first transistor configured to be turned on by a third clock signal input to a third clock terminal and control the voltage of the first control node with a voltage of a previous carry signal, which is a carry signal input from a previous stage;

a second transistor configured to be turned on when the first control node is at a first level voltage and control a voltage of the second control node with a second voltage input to the second voltage input terminal; and a third transistor configured to be turned on by a next carry signal, which is a carry signal input from a next stage, and control the voltage of the second control node with a first voltage input to the first voltage input terminal, wherein the first voltage is higher than the second voltage.

2. The gate driving circuit of claim 1, wherein the second voltage is lower than a third voltage input to the third voltage input terminal, and the first voltage is higher than the second voltage and the third voltage.

3. The gate driving circuit of claim 1, wherein the first level voltage and a second level voltage lower than the first level voltage of each of a first clock signal and a second clock signal are alternately input during the display period, wherein the first level voltages of the first clock signal and the second clock signal are input during the sensing period.

4. The gate driving circuit of claim 3, wherein the third clock signal is an inverted signal of the second clock signal, a period in which the second clock signal is at the first level voltage overlaps a period in which the first clock signal is at the first level voltage, and the period in which the first clock signal is at the first level voltage is shorter than the period in which the second clock signal is at the first level voltage.

5. The gate driving circuit of claim 1, wherein each of the first transistor and the second transistor comprises a first sub-transistor and a second sub-transistor connected in series.

6. The gate driving circuit of claim 5, wherein the first controller further comprises a fourth transistor connected to the first voltage input terminal and an intermediate node between the first sub-transistor and the second sub-transistor of the first transistor and having a gate connected to the first control node.

7. The gate driving circuit of claim 5, wherein the first controller further comprises a fifth transistor connected to the first voltage input terminal and an intermediate node between the first sub-transistor and the second sub-transistor of the second transistor and having a gate connected to the second control node.

8. The gate driving circuit of claim 7, wherein the first controller further comprises a tenth transistor connected between the first transistor and the first control node and having a gate connected to the first voltage input terminal.

9. The gate driving circuit of claim 1, wherein the first controller further comprises a sixth transistor connected to the first voltage input terminal and the second control node and having a gate receiving a reset signal.

10. The gate driving circuit of claim 1, further comprising a second controller connected to the first voltage input terminal and the first control node and configured to control the voltage of the first control node during a sensing period of the one frame, wherein the second controller comprises:

a first capacitor connected to the first voltage input terminal and a sensing node;

a seventh transistor connected to the sensing node and the second output portion and including a first sub-transistor and a second sub-transistor connected in series;

an eighth transistor connected to the first voltage input terminal and an intermediate node between the first sub-transistor and the second sub-transistor of the seventh transistor and having a gate connected to the sensing node; and a ninth transistor connected to the intermediate node of the seventh transistor and the first control node.

11. The gate driving circuit of claim 10, wherein the seventh transistor is configured to be turned on by a first control signal synchronized with a carry signal output from the second output portion during the display period and set a voltage of the sensing node to a voltage of the carry signal.

12. The gate driving circuit of claim 11, wherein the first capacitor stores a voltage difference between a terminal connected to the first voltage input terminal and a terminal connected to the sensing node.

13. The gate driving circuit of claim 12, wherein the ninth transistor is configured to be turned on by a second control signal input during the sensing period and set the voltage of the first control node to the first voltage transferred through the turned-on eighth transistor.

14. The gate driving circuit of claim 1, wherein the second output portion comprises a second capacitor connected between the first control node and an output terminal of the second output portion.

15. A gate driving circuit comprising a plurality of stages, wherein each of the plurality of stages comprises:

a first controller connected to a first voltage input terminal and a second voltage input terminal and configured to control voltages of a first control node and a second control node during a display period of one frame;

a first output portion connected to a first clock terminal and a third voltage input terminal and configured to output a gate signal; and a second output portion connected to a second clock terminal and the second voltage input terminal and configured to output a carry signal, wherein the first controller comprises:

a first transistor configured to be turned on by a third clock signal input to a third clock terminal and control the voltage of the first control node with a voltage of a previous carry signal, which is a carry signal input from a previous stage;

a second transistor configured to be turned on when the first control node is at a first level voltage and control a voltage of the second control node with a second voltage input to the second voltage input terminal; and a third transistor configured to be turned on by a next carry signal, which is a carry signal input from a next stage, and control the voltage of the second control node with a first voltage input to the first voltage input terminal, wherein the first output portion comprises a plurality of sub-output portions, wherein one of a plurality of first clock signals is input to a first clock terminal of each of the plurality of sub-output portions, and the plurality of first clock signals are signals having a same waveform and shifted in phase at a certain interval.

16. The gate driving circuit of claim 15, wherein the second output portion comprises a first sub-output portion and a second sub-output portion, wherein the first sub-output portion outputs, to a next stage, a first carry signal synchronized with a 2nd-1 clock signal input to a second clock terminal of the first sub-output portion, and the second sub-output portion outputs, to a previous stage, a second carry signal synchronized with a 2nd-2 clock signal input to a second clock terminal of the second sub-output portion.

17. The gate driving circuit of claim 16, wherein a period in which the 2nd-1 clock signal is at the first level voltage overlaps periods in which a plurality of first clock signals input to the plurality of sub-output portions of the first output portion are at the first level voltage, a period in which the 2nd-1 clock signal is at the first level voltage overlaps a period in which the 2nd-2 clock signal is at the first level voltage, and the period in which the 2nd-2 clock signal is at the first level voltage is shorter than the period in which the 2nd-1 clock signal is at the first level voltage.

18. The gate driving circuit of claim 17, further comprising a second controller connected to the first voltage input terminal and the first control node and configured to control the voltage of the first control node during a sensing period of the one frame, wherein the second controller comprises:

an eleventh transistor connected to the first control node and the second voltage input terminal and having a gate connected to a sensing node; and a twelfth transistor connected between the first control node and the eleventh transistor, wherein the twelfth transistor is configured to be turned on by a third control signal input after the sensing period and set the voltage of the first control node to the second voltage transferred through the turned-on eleventh transistor.

19. A gate driving circuit comprising a plurality of stages, wherein each of the plurality of stages comprises:

a first transistor connected between a first input terminal receiving a start signal and a first control node and having a gate connected to a first clock terminal;

a second transistor connected to a first voltage input terminal and an intermediate node between a first sub-transistor and a second sub-transistor of the first transistor and having a gate connected to the first control node;

a third transistor connected between a second control node and a second voltage input terminal and having a gate connected to the first control node;

a fourth transistor connected to the first voltage input terminal and an intermediate node between a first sub-transistor and a second sub-transistor of the third transistor and having a gate connected to the second control node;

a fifth transistor connected between the first voltage input terminal and the second control node and having a gate connected to a second input terminal to which a carry signal of a next stage is input;

a first pull-up transistor connected between a second clock terminal and a first output terminal and having a gate connected to the first control node;

a first pull-down transistor connected between the first output terminal and a third voltage input terminal and having a gate connected to the second control node;

a second pull-up transistor connected between a third clock terminal and a second output terminal and having a gate connected to the first control node;

a second pull-down transistor connected between the second output terminal and the second voltage input terminal and having a gate connected to the second control node.

20. The gate driving circuit of claim 19, further comprising:

a first capacitor connected between the first voltage input terminal and a sensing node;

a sixth transistor connected between the sensing node and the second output terminal and having a gate connected to a first control signal terminal;

a seventh transistor connected to the first voltage input terminal and an intermediate node between a first sub-transistor and a second sub-transistor of the sixth transistor and having a gate connected to the sensing node; and an eighth transistor connected between the intermediate node of the sixth transistor and the first control node and having a gate connected to a second control signal terminal.

* * * * *